(12) United States Patent
Kalina

(10) Patent No.: US 7,685,821 B2
(45) Date of Patent: Mar. 30, 2010

(54) SYSTEM AND PROCESS FOR BASE LOAD POWER GENERATION

(76) Inventor: Alexander I. Kalina, 105 Glengarry Way, Hillsborough, CA (US) 94010-0429

( * ) Notice: Subject to any disclaimer, the term of this patent is extended or adjusted under 35 U.S.C. 154(b) by 980 days.

(21) Appl. No.: 11/399,306

(22) Filed: Apr. 5, 2006

(65) Prior Publication Data

US 2007/0234722 A1     Oct. 11, 2007

(51) Int. Cl.
   *F01K 25/06*     (2006.01)
(52) U.S. Cl. ............................. 60/649; 60/651; 60/671
(58) Field of Classification Search .................. 60/649, 60/651, 655, 671
   See application file for complete search history.

(56) References Cited

U.S. PATENT DOCUMENTS

| | | | | |
|---|---|---|---|---|
| 6,735,948 B1 | 5/2004 | Kalina | | 60/649 |
| 6,769,256 B1 | 8/2004 | Kalina | | 60/653 |
| 6,820,421 B2 | 11/2004 | Kalina | | 60/649 |
| 6,829,895 B2 | 12/2004 | Kalina | | 60/649 |
| 6,910,334 B2 | 6/2005 | Kalina | | 60/651 |
| 6,923,000 B2 | 8/2005 | Kalina | | 60/649 |
| 6,941,757 B2 | 9/2005 | Kalina | | 60/649 |
| 6,968,690 B2 | 11/2005 | Kalina | | 60/649 |
| 7,021,060 B1 | 4/2006 | Kalina | | 60/649 |
| 7,043,919 B1 | 5/2006 | Kalina | | 60/651 |
| 7,055,326 B1 | 6/2006 | Kalina | | 60/649 |
| 7,065,967 B2 | 6/2006 | Kalina | | 60/649 |
| 7,065,969 B2 | 6/2006 | Kalina | | 60/670 |
| 7,398,651 B2 * | 7/2008 | Kalina | | 60/649 |
| 7,458,218 B2 * | 12/2008 | Kalina | | 60/649 |
| 7,469,542 B2 * | 12/2008 | Kalina | | 60/649 |
| 2005/0061654 A1 | 3/2005 | Kalina | | 203/21 |
| 2006/0096288 A1 | 5/2006 | Kalina | | 60/649 |
| 2006/0096290 A1 | 5/2006 | Kalina | | 60/649 |
| 2006/0165394 A1 | 7/2006 | Kalina | | 392/386 |
| 2006/0199120 A1 | 9/2006 | Kalina | | 431/9 |

OTHER PUBLICATIONS

U.S. Appl. No. 11/514,290, filed Aug. 31, 2006, Kalina.
U.S. Appl. No. 11/399,287, filed Apr. 5, 2006, Kalina.
U.S. Appl. No. 11/238,173, filed Sep. 28, 2005, Kalina.
U.S. Appl. No. 11/235,654, filed Sep. 22, 2005, Kalina.
U.S. Appl. No. 11/227,991, filed Sep. 15, 2005, Kalina.

* cited by examiner

*Primary Examiner*—Hoang M Nguyen
(74) *Attorney, Agent, or Firm*—Robert W. Strozier

(57) ABSTRACT

A system and process are disclosed for converting thermal energy into power from three different compositional streams of a multi-component working fluid, one of the streams being a lean working fluid stream pressurized into its super-critical state before being vaporized in a heat recovery vapor generator, another stream is a rich working fluid steam and the third stream is an intermediate working fluid stream, where the system and process has increased overall efficiency.

8 Claims, 13 Drawing Sheets

Variant 4b

Variant 5b

FIG. 13

SYSTEM AND PROCESS FOR BASE LOAD POWER GENERATION

BACKGROUND OF THE INVENTION

1. Field of the Invention

The present invention relates to a system and process for the generation of electrical power or other useable energy in base load applications by converting thermal energy in working fluid stream into the power or other useable energy.

More particularly, the present invention relates to a system and process for the generation of electrical power or other useable energy in base load applications, the system and process involves converting thermal energy into electrical power or other useable energy from three different compositional streams of a multi-component working fluid, one of the streams being a lean working fluid stream pressurized into its super-critical state before being vaporized in a heat recovery vapor generator, another stream is a rich working fluid steam and the third stream is an intermediate working fluid stream, where the system and process of this invention has increased overall efficiency.

2. Description of the Related Art

In the process of the combustion of fuels, a minimum quantity of air, that is theoretically necessary for complete combustion of the fuel, is such that all oxygen contained in the air supplied to the combustion is completely consumed or used. Such a process is referred as a stoichiometric process, and corresponds to the highest temperature in the combustion zone given a combustion process that uses air as the oxidant.

However, in actual practice, all current industrially used combustion systems operate with some excess of air, i.e., an amount of air in excess of the stoichiometric amount, that is necessary to assure the complete combustion of the fuel. This excess air results in a lowering of the temperature of combustion. The greater the excess of air, the lower the temperature of combustion and the less heat available for conversion to a useable from of energy.

However, the greater the excess of air, the greater the flow rate of the produced flue gases. Because the flue gas cannot be cooled to a temperature equal to the initial temperature of the supplied air, the quantity of heat rejected into the atmosphere by the flue gas increases with increasing amounts of excess air. This results in a reduction of the efficiency of the combustion system.

Therefore, in conventional combustion systems, in order to operate with a minimum of excess of air, the tubes in which the boiling of a working fluid of a power cycle occurs, (so-called "waterwall" tubes), are located directly in the combustion zone. This allows the heat of combustion to be partially absorbed by the boiling of the working fluid, and thus controls the temperature in the combustion zone. Such systems are known as conventional boiler combustion systems. These systems are, perforce, expensive and complex structures that require a high degree of maintenance, especially due to the fact that the waterwall tubes are subjected to very high thermal stresses.

On the other hand, in so-called fluidized bed combustors, (which have several advantages), the excess of air is usually very high due to the fact that there is a substantial flow of air needed to maintain the fluidized bed. As a result, fluidized bed boiler/combustors have substantially reduced efficiencies.

In general, it would be extremely desirable, and would present a great simplification, if combustion were to be performed in a separate combustion chamber without the need for internal cooling by waterwall tubes, while at the same time operating with a minimum of excess air. All heat produced by the combustion would thus be accumulated in a stream of hot flue gas which could then be utilized in a heat recovery steam generator (HRSG) or a heat recovery vapor generator (HRVG). HRSG and HRVG systems are relatively simple heat exchangers which are substantially less expensive than conventional boilers. A combustion system with such a structure would be substantially more reliable and less expensive than a conventional boiler/combustion system.

But in such a case, the temperature in the combustion chamber would become unacceptably high, such that the materials out of which the combustion chamber is constructed would be unable to withstand such temperatures. Moreover, the flue gases produced would have such a high temperature that they would not be able to be used directly to provide heat to the heat exchangers of a power system, especially if these heat exchangers are used to superheat vapor.

Separate combustion chambers, without internal waterwall cooling, have been used for the combustion of low quality fuels, particularly those with high water contents, such as biomass. However, even in these cases, the temperature of the flue gas produced is too high to be directly used in the heat exchangers of a power system.

Usually, in such cases, the hot flue gas is used to heat an intermediate heat carrying fluid, which in its turn is then used to provide heat to the heat exchangers of the power system. However such an arrangement results in the addition of substantial complications to the entire system.

Thus, there is a need in the art for a system and process for the generation of power in base load applications, converting thermal energy into power utilizing supercritical pressure, with the aim of increasing the overall efficiency of the system

SUMMARY OF THE INVENTION

The present invention provides a method and a system for extracting useable work from a combustion gas or flue gas includes a process and subsystem for condensing a spent working fluid stream such as a condenser or a more complex condensation and thermal compression subsystem CTCSS. The method and system also includes a heat recovery vapor generator HRVG or other type of vaporizers for multi-component working fluids. The process and system also includes an energy recovery subsystem having three sections that utilizes a lean working fluid stream, a rich working fluid stream and an intermediate composition working fluid stream. The spent rich working fluid stream is forwarded to the condensation subsystem, which returns a fully condensed rich working fluid stream. The intermediate composition stream includes the entire spent lean working fluid stream and a portion of the rich working fluid stream. The spent intermediate composition stream is processed to produce a fully condensed very lean working fluid stream and a fully condensed stream compositionally equivalent to the fully condensed rich working fluid stream exiting the condenser. The combination of these two rich working fluid streams comprises the fully condensed rich working fluid stream that is then fully vaporized in an inter-stream heat exchange subsystem and in a portion of the heat recovery vapor generator HRVG subsystem. The external combustion gas or flue gas used in the HRVG comprises a mixture of an initial flue or combustion gas stream derived directly from a combustor and a portion of the spent flue gas stream exiting the heat recovery vapor generator HRVG to maintain a temperature of the combined flue gas stream below a temperature that places undue thermal stresses on the heat recovery vapor generator HRVG.

The present invention also provides a method for converting thermal energy from a flue gas stream that is used to produce three fully vaporized working fluid stream having different compositions, one lean, one rich and one intermediate. The thermal energy conversion is accomplished in three turbines, a lean working fluid high pressure turbine, an intermediate working fluid stream or low concentration turbine and a two stage rich working fluid turbine subsystem including a rich working fluid high pressure turbine and a rich working fluid stream low pressure turbine. The lean working fluid stream and the rich working fluid stream are fully vaporized in a heat recovery vapor generator HRVG subsystem with heat from the flue gas stream. A spent rich working fluid stream for the rich working fluid turbine subsystem is fully condensed in a condensation and thermal compression subsystem CTCSS. The intermediate working fluid stream comprises a reheated spent lean working fluid stream and a portion of the fully vaporized rich working fluid stream. The lean working fluid stream comprising a very lean working fluid stream and a first portion of a partially vaporized rich working fluid stream, where the very lean working fluid stream is derived from a scrubber/separator subsystem.

The present invention provides an apparatus for deriving useable energy from flue gas stream including a heat recovery vapor generator HRVG subsystem adapted to produce a fully vaporized lean working fluid stream and a fully vaporized rich working fluid stream. The apparatus also includes an energy extraction subsystem including a lean working fluid high pressure turbine, an intermediate working fluid or low concentration turbine, a rich working fluid high pressure turbine and a rich working fluid stream low pressure turbine. The apparatus also includes a condensation and thermal compression subsystem CTCSS adapted to fully condense a spent rich working fluid stream exiting the low pressure turbine. The apparatus also includes a scrubber/separator subsystem for forming the lean working fluid. The apparatus also includes a heat exchange subsystem for exchanging heat between various internal streams.

BRIEF DESCRIPTION OF THE DRAWINGS

The invention can be better understood with reference to the following detailed description together with the appended illustrative drawings in which like elements are numbered the same.

Power System/Apparatus

Condensation and Thermal Compression Subsystem CTCSS

Figure 4:
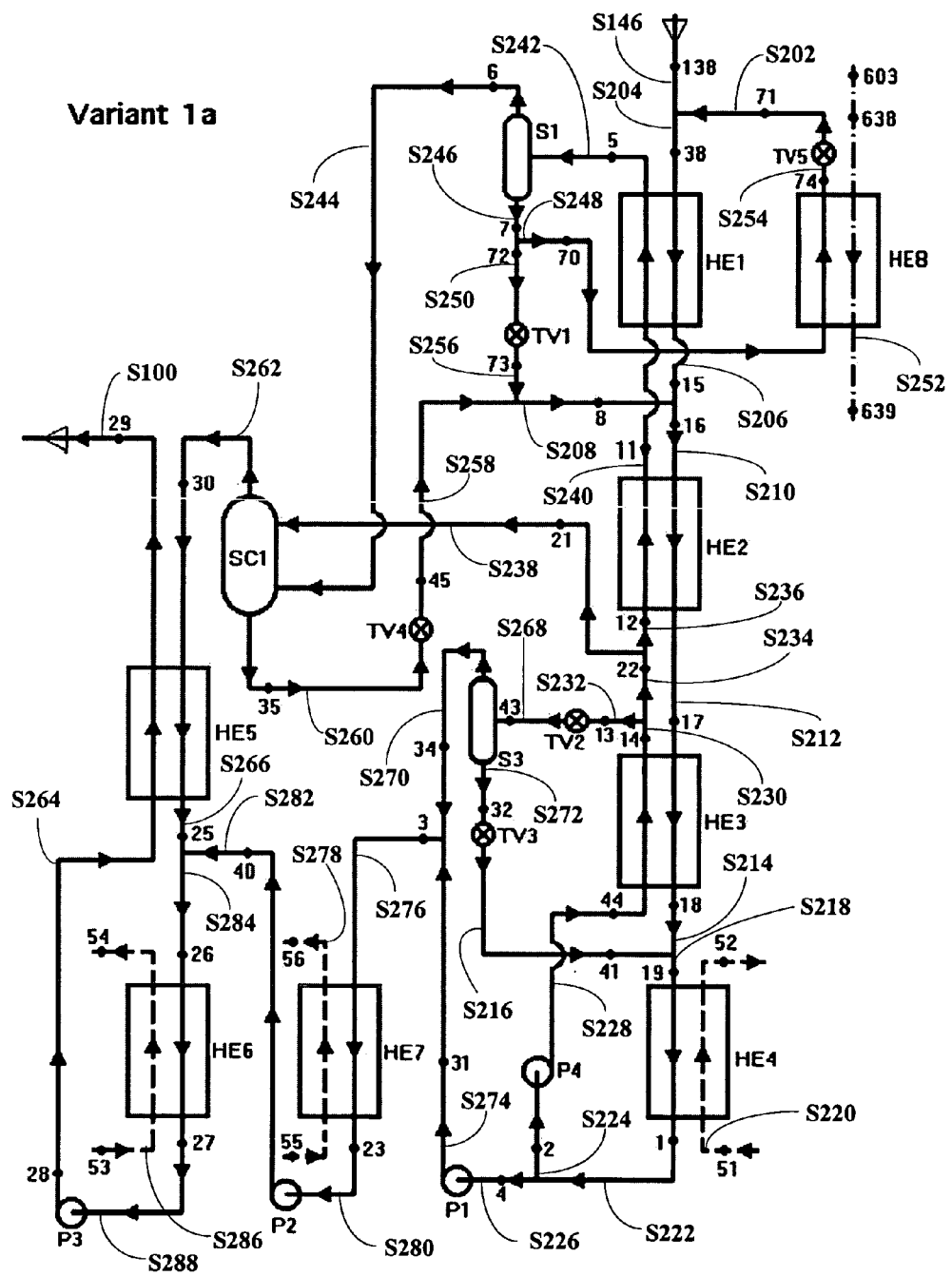
Figure 5:
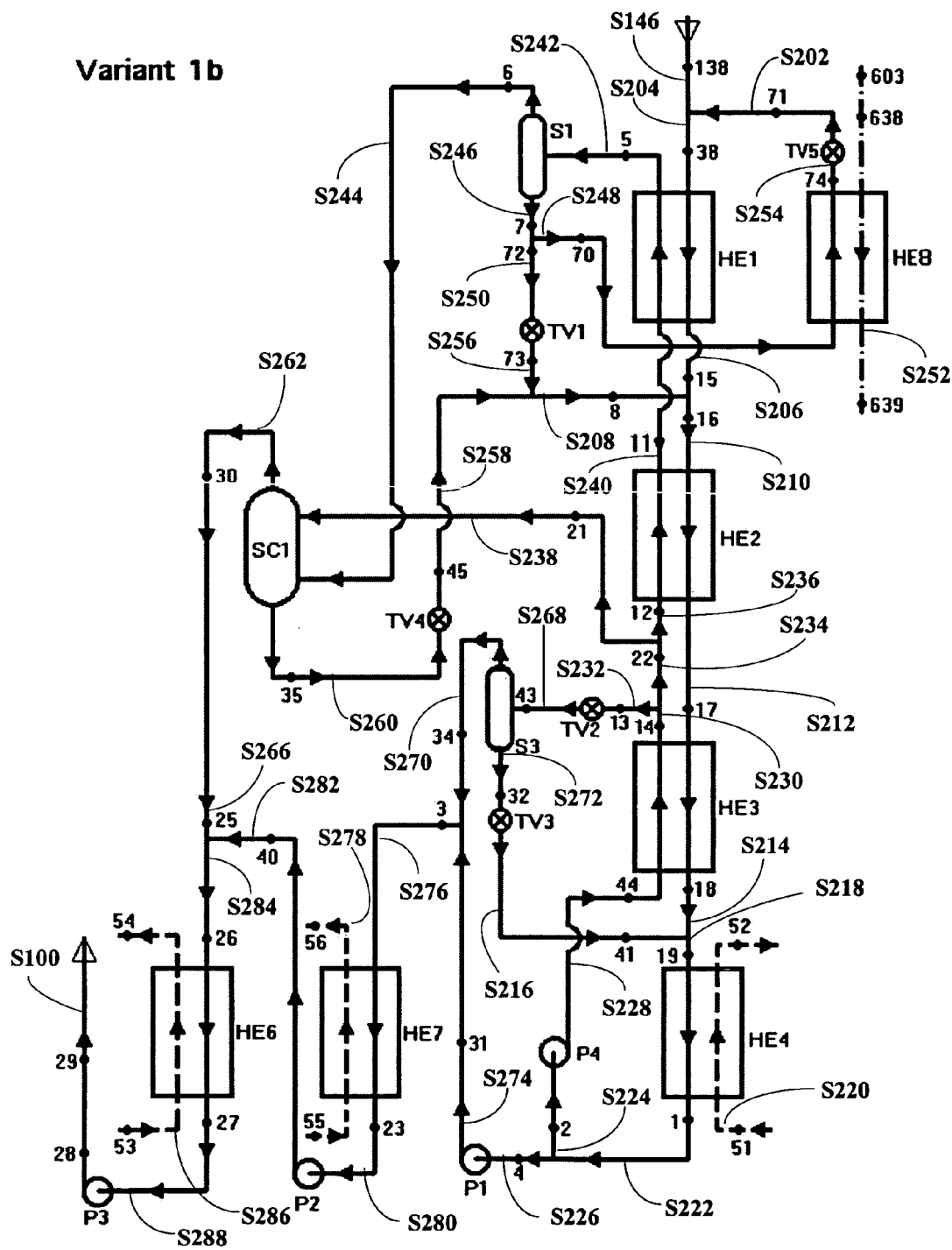
Figure 6:
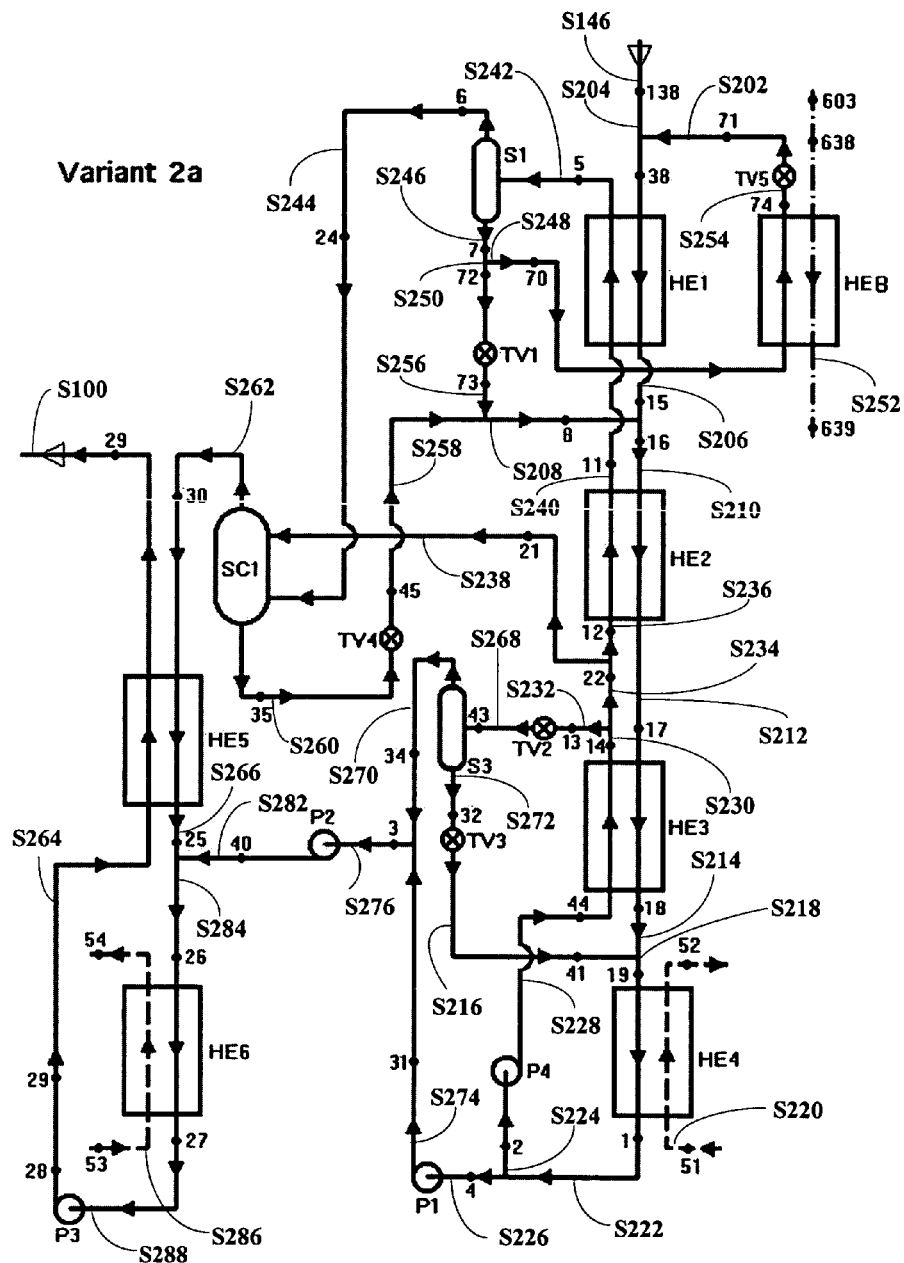
Figure 7:
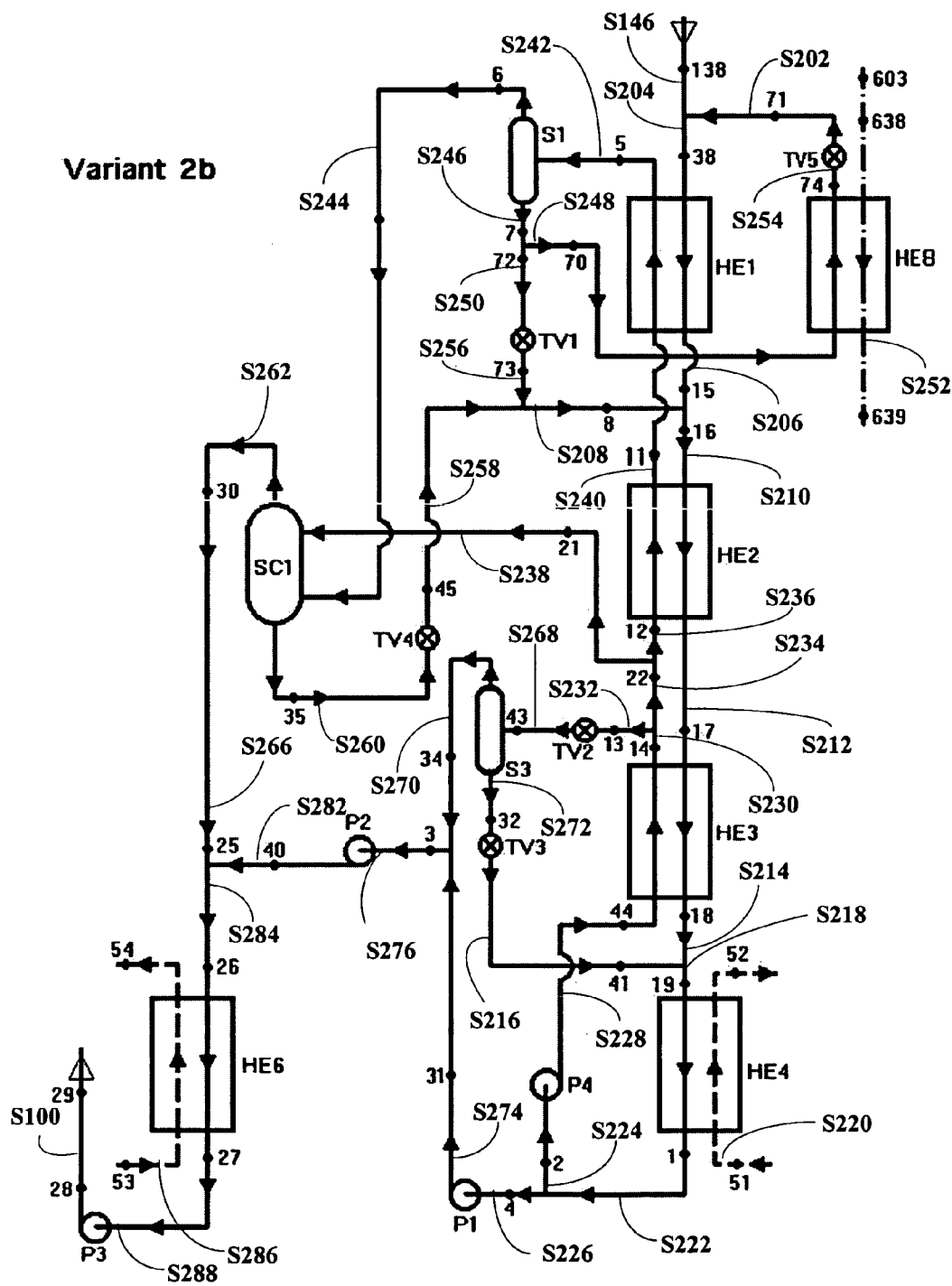
Figure 8:
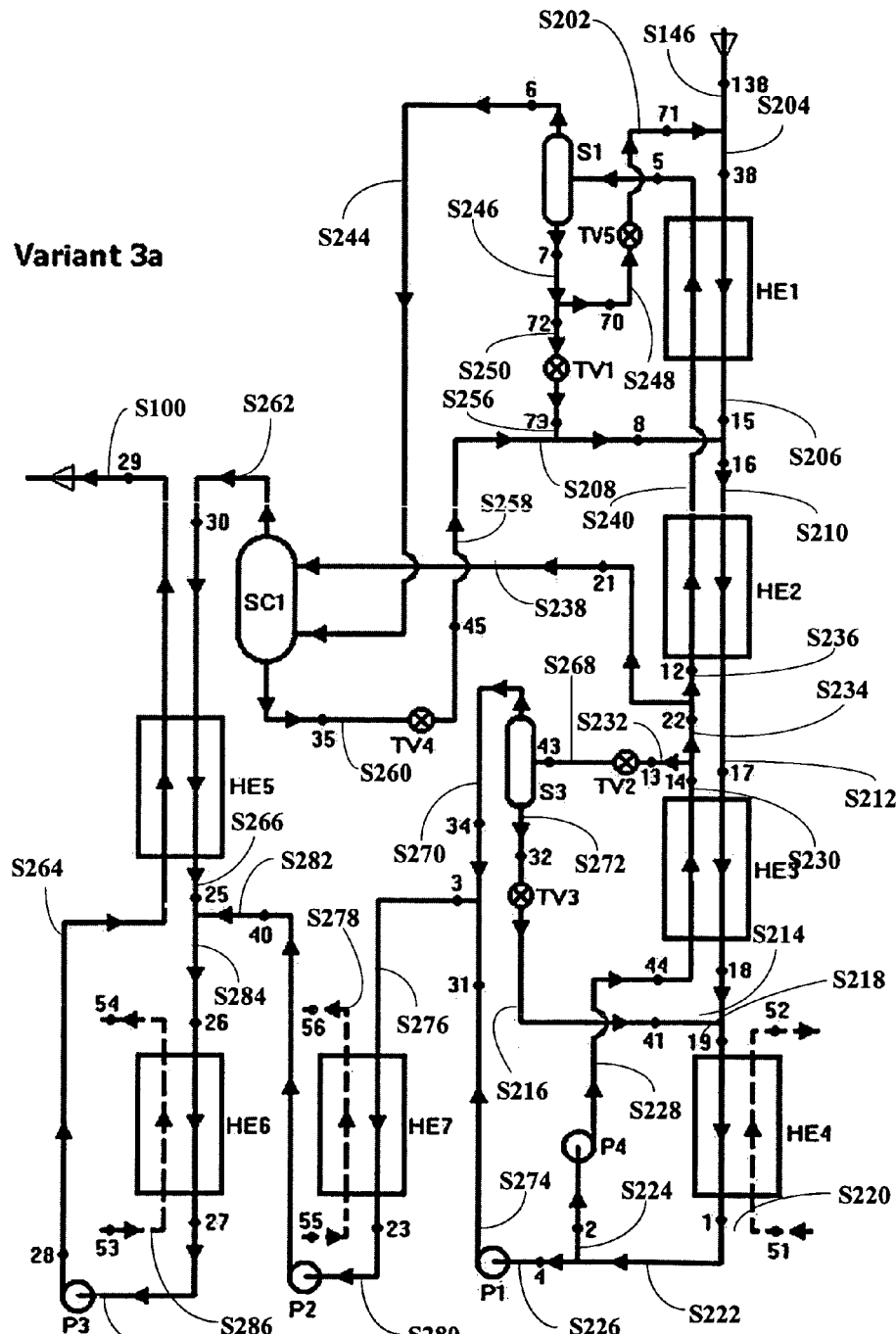
Figure 9:
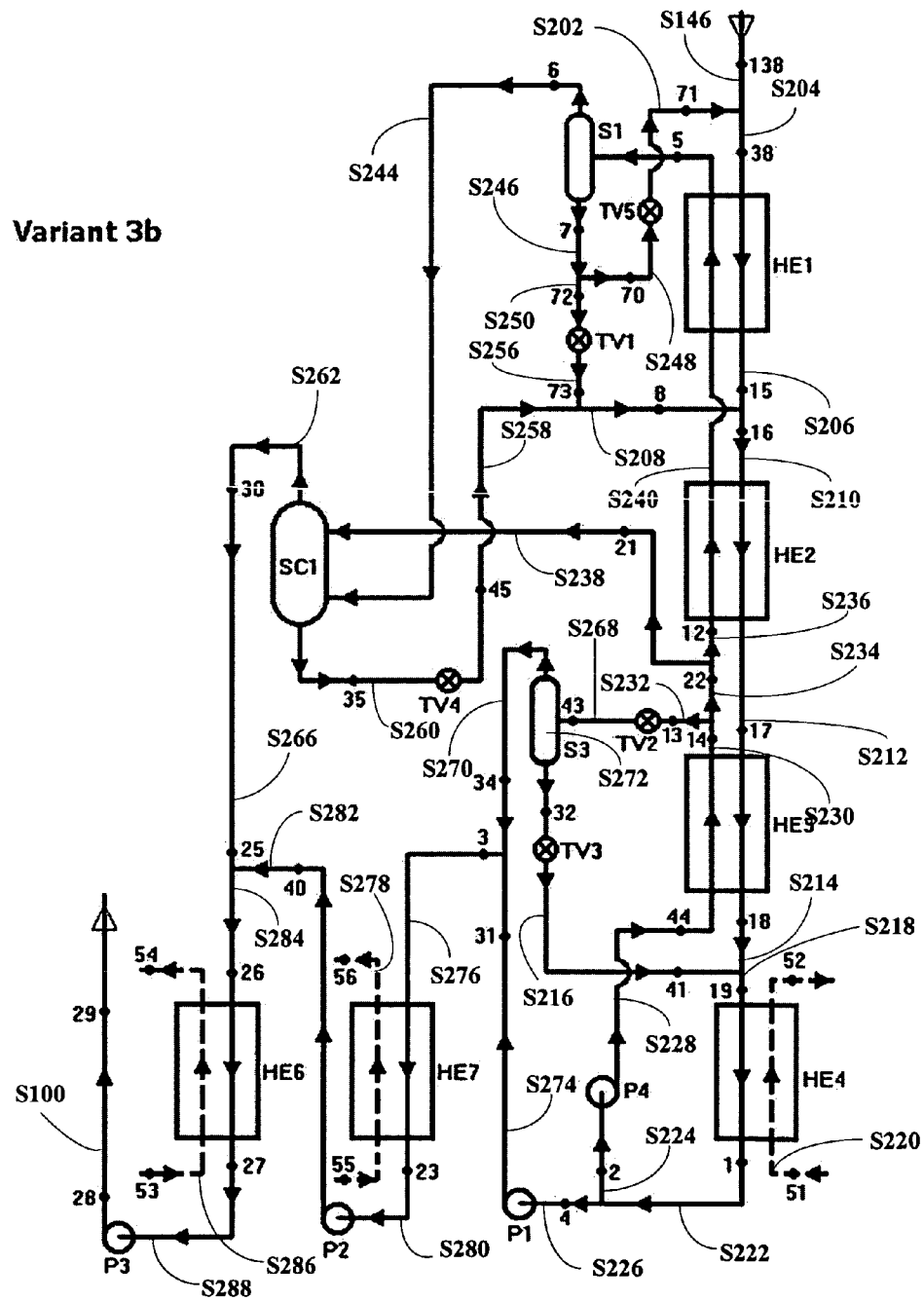
Figure 10:
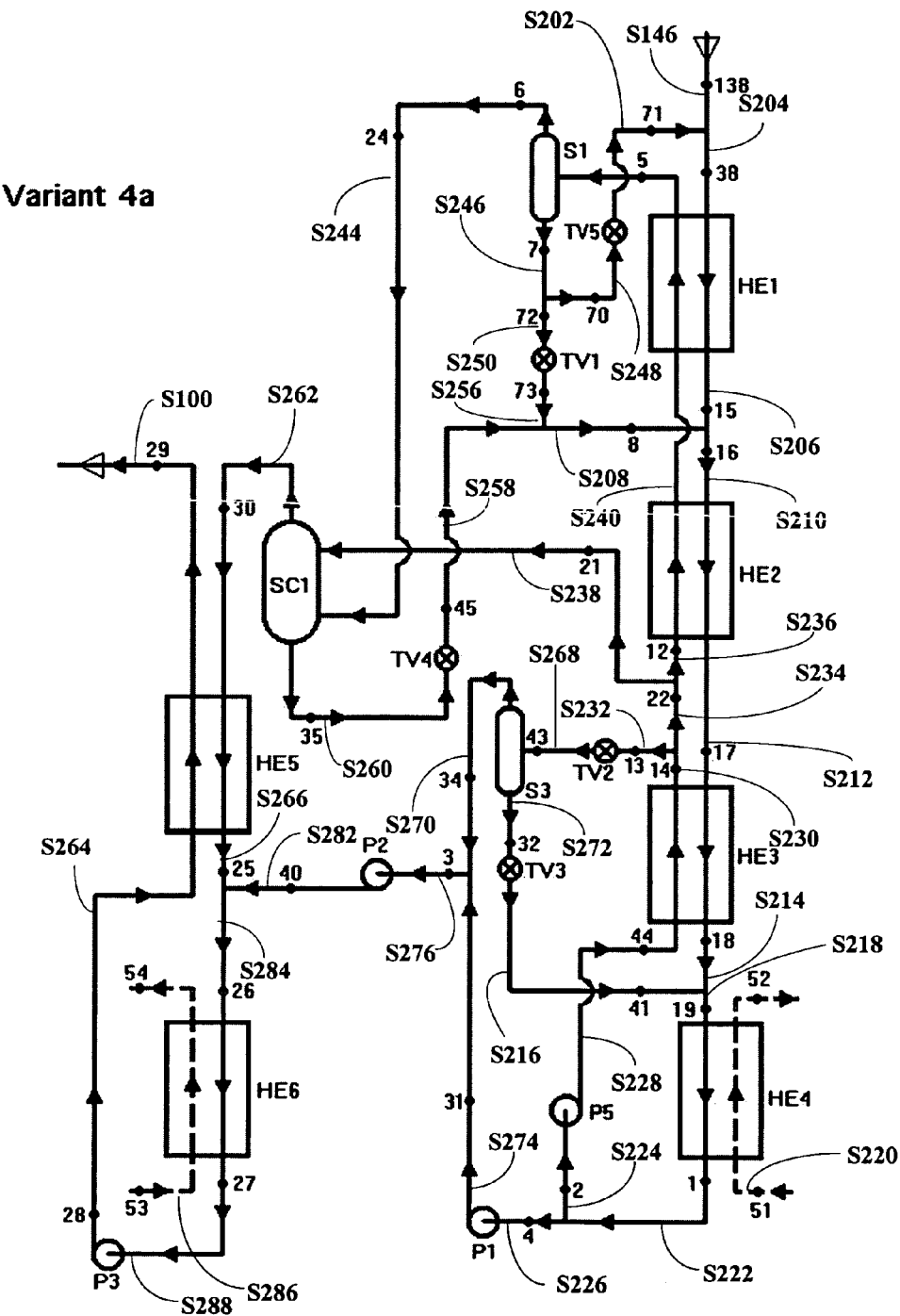
Figure 11:
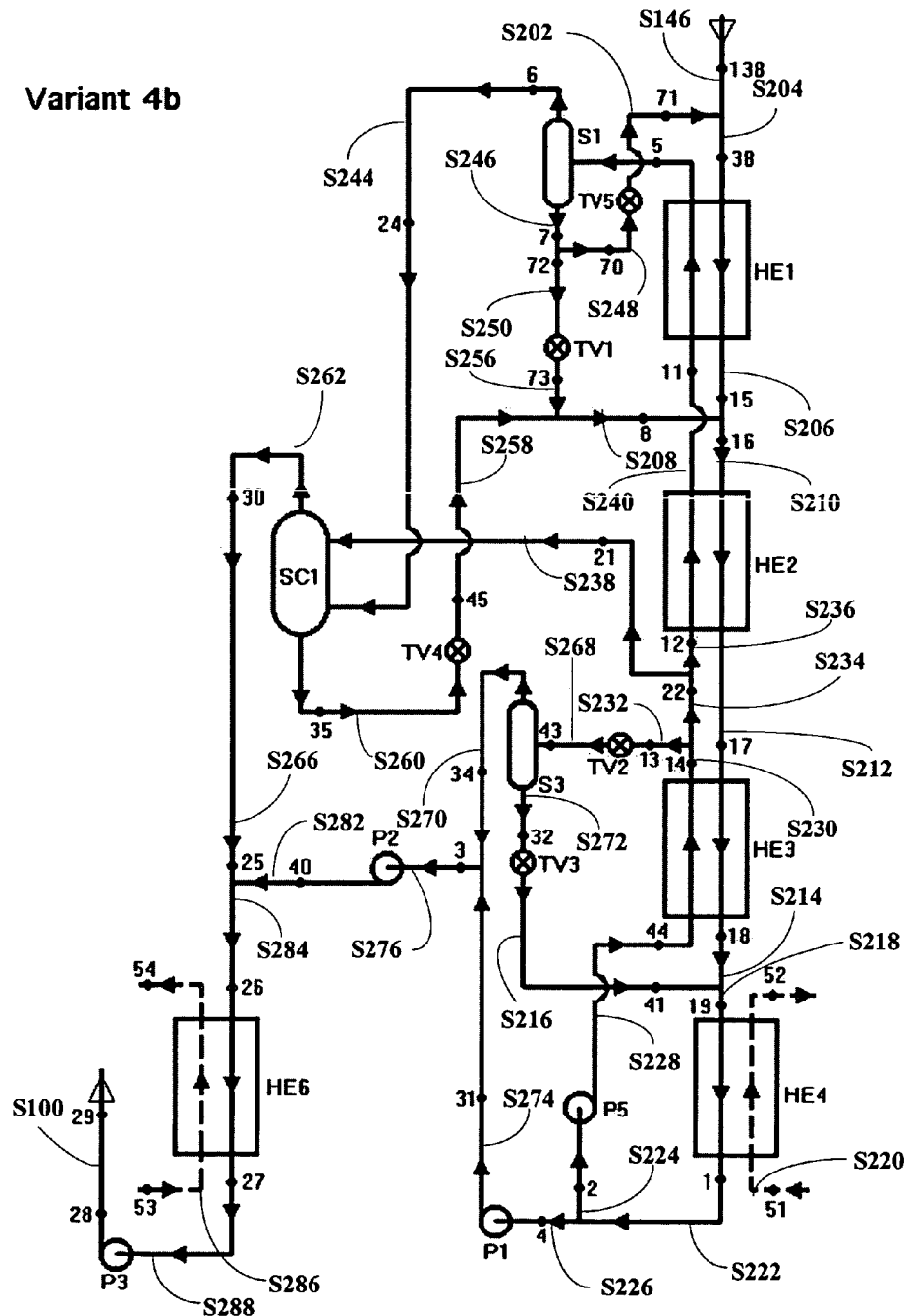
Figure 12:
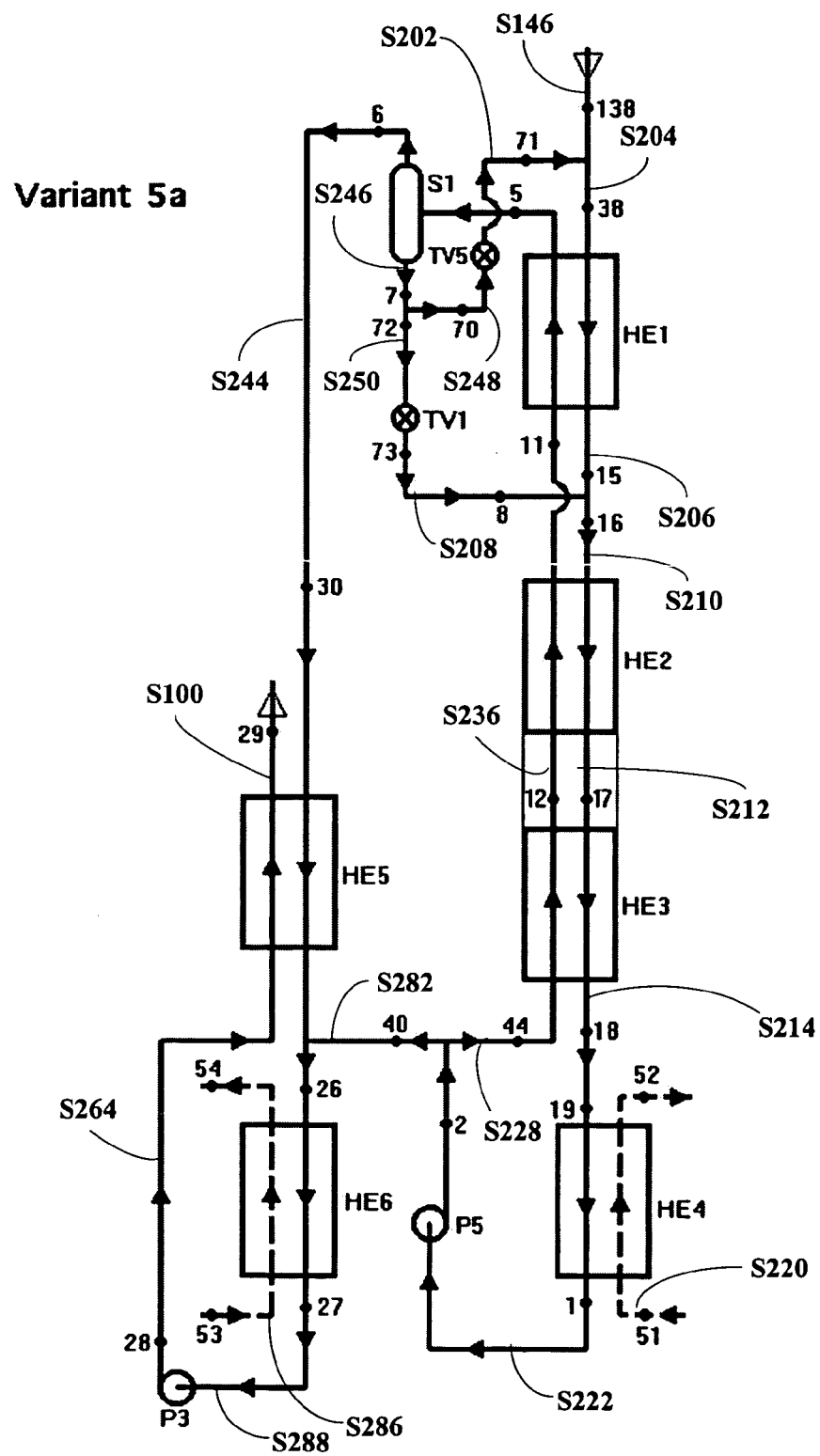

FIG. 4 depicts a block diagram of a preferred embodiment of CTCSS Variant 1a of a condensation and thermal compression subsystems;

FIG. 5 depicts a block diagram of another preferred embodiment of CTCSS Variant 1b of a condensation and thermal compression subsystems;

FIG. 6 depicts a block diagram of a preferred embodiment of CTCSS Variant 2a of a condensation and thermal compression subsystems;

FIG. 7 depicts a block diagram of a preferred embodiment of CTCSS Variant 2b of a condensation and thermal compression subsystems;

FIG. 8 depicts a block diagram of a preferred embodiment of CTCSS Variant 3a of a condensation and thermal compression subsystems;

FIG. 9 depicts a block diagram of a preferred embodiment of CTCSS Variant 3b of a condensation and thermal compression subsystems;

FIG. 10 depicts a block diagram of a preferred embodiment of CTCSS Variant 4a of a condensation and thermal compression subsystems;

FIG. 11 depicts a block diagram of a preferred embodiment of CTCSS Variant 4b of a condensation and thermal compression subsystems;

FIG. 12 depicts a block diagram of a preferred embodiment of CTCSS Variant 5a of a condensation and thermal compression subsystems; and FIG. 13 depicts a block diagram of a preferred embodiment of CTCSS Variant 5b of a condensation and thermal compression subsystems.

DETAILED DESCRIPTION OF THE INVENTION

The inventors have found that a power system and apparatus can be constructed using heat from a high temperatures combustor to extract heat from three different compositional stream derived from a single multi-component fluid, where the system and apparatus includes three different energy extraction components designed to three working fluid stream of different compositional makeup.

The present invention relates to a method for extracting energy from a multi-component working fluid comprising the step of forming a fully condensed, high pressure rich working fluid stream from a spent rich working fluid stream, where the rich working fluid stream has a high concentration of a low boiling component of the multi-component working fluid. The method also includes the step of forming a fully condensed, high pressure lean working fluid stream from a first portion of a partially vaporized, high pressure rich working fluid stream and a very lean liquid stream having a very low concentration of the low boiling component of the multi-component fluid, where the lean working fluid stream has a low concentration of the low boiling component of the multi-component working fluid. The method also includes the step of vaporizing a second portion of the partially vaporized, high pressure rich working fluid stream with heat derived from a mixed flue gas stream and a spent intermediate working fluid stream to form a fully vaporized high pressure rich working fluid stream. The method also includes the step of vaporizing the fully condensed lean working fluid stream heat derived from the mixed flue gas stream and a spent, intermediate pressure rich working fluid stream to form a fully vaporized high pressure lean working fluid stream and a cooled, spent, intermediate pressure rich working fluid stream. The method also includes the step of extracting a first amount of electric power or other useable energy from a portion of thermal energy in the fully vaporized high pressure lean working fluid stream in a first high pressure turbine to form a spent lean working fluid stream. The method also includes the step of forming a fully vaporized intermediate working fluid stream form a first portion of the fully vaporized high pressure rich working fluid stream and a reheated spent lean working fluid stream, where the intermediate working fluid stream has a concentration of the low boiling component of the multi-component fluid between the high concentration of the rich working fluid and the low concentration of the lean working fluid. The method also includes the step of extracting a second amount of electric power or other useable energy from a portion of thermal energy in the fully vaporized intermediate working fluid stream in a low concentration turbine to form the spent intermediate working fluid stream. The method also includes the step of extracting a third amount of electric power or other useable energy from a portion of thermal energy in a second portion of the high pressure rich working fluid stream in a second high pressure turbine to form the spent, intermediate pressure rich working fluid stream. The method also includes the step of extracting a fourth amount of electric power or other useable energy from a portion of thermal energy in the cooled, spent, intermediate pressure rich working fluid stream in a low pressure turbine to form the spent rich working fluid stream.

The present invention relates to an apparatus for extracting energy in a thermodynamic cycle comprising a vaporizing subsystem adapted to (a) fully vaporize a higher pressure, lean working fluid stream comprising a first portion of a partially vaporized, higher pressure rich working fluid stream and a very lean liquid stream, (b) fully vaporize a first portion of a higher pressure, rich working fluid stream, and (c) reheat a spent lean working fluid stream from heat derived from a mixed flue gas stream forming a fully vaporized, higher pressure lean working fluid stream, a fully vaporized, higher pressure rich working fluid stream, and a reheated, spent lean working fluid stream. The apparatus also includes an energy conversion subsystem including: (a) a first high pressure turbine adapted to convert a portion of thermal energy in the fully vaporized, higher pressure lean working fluid stream into a first amount of useable energy forming the spent lean working fluid stream, (b) a low concentration turbine adapted to convert a portion of thermal energy in a fully vaporized, intermediate working fluid stream into a second amount of useable energy, where the fully vaporized intermediate working fluid stream comprises a first portion of a pressure adjusted, fully vaporized, rich working fluid stream and the reheated, spent lean working fluid stream forming a spent intermediate working fluid stream, and (c) a rich working fluid stream extraction unit including (i) a second high pressure turbine or stage adapted to convert a portion of thermal energy in with a second portion of the fully vaporized, higher pressure rich working fluid stream into a third amount of useable energy forming a spent, intermediate pressure rich working fluid stream and (ii) a low pressure turbine or stage adapted to convert a portion of heat associated with a cooled, spent, intermediate pressure rich working fluid stream into a fourth amount of useable energy to form a spent rich working fluid stream. The apparatus also includes a separation subsystem including (a) a scrubber adapted to scrub and separate a first portion of a cooled, spent intermediate working fluid stream and a first portion of a lean liquid stream into a first enriched vapor stream and the very lean liquid stream, and (b) a separator adapted to separate a mixed stream comprising a cooled second portion of the cooled, spent intermediate working fluid stream and the first enriched vapor stream into a second enriched vapor stream and the lean liquid stream. The apparatus also includes a condensation subsystem adapted to fully condense the spent rich working fluid stream into a first fully condensed rich working fluid stream. The apparatus also includes a heat exchange subsystem including: (a) a first heat exchange unit adapted to fully condense a second rich working fluid stream comprising the second enriched vapor stream and a second portion of the lean liquid stream and to heat a combined, higher pressure rich working fluid stream comprising a first fully condensed, higher pressure rich working fluid stream and a second fully condensed, higher pressure rich working fluid stream, (b) a second heat exchange unit adapted to partially vaporize the combined rich working fluid stream and to cool the second portion of the spent intermediate working fluid stream forming a partially vaporized, higher pressure rich working fluid stream and the cooled second portion of the cooled, spent intermediate working fluid stream, and (c) a third heat exchange unit adapted to vaporize a second portion of the partially vaporize the combined rich working fluid stream and to cool the spent intermediate working fluid stream forming the vaporized, higher pressure rich working fluid stream and the cooled spent intermediate working fluid. The apparatus can also a pressurizing subsystem including: (a) a first pump adapted to increase a pressure of the first fully condensed rich working fluid stream to form the first fully condensed, higher pressure rich working fluid stream, (b) a second pump adapted to increase a pressure of the second fully condensed rich working fluid stream to form the second fully condensed, higher pressure rich working fluid stream, (c) a third pump adapted to increase a pressure of the fully condensed lean working fluid stream to form the fully condensed, high pressure lean working fluid stream.

The system and method of this invention is designed to utilizes a combustor as disclosed in U.S. patent application Ser. No. 11/069,769, filed 1 Mar. 2005; however the system and method of this invention can be used with any combustor or combustion unit known in the art. The present method and system is also designed to utilize a condensation thermal compression subsystem as disclosed in U.S. patent application Ser. No. 10/984,021, filed 8 Nov. 2004; however, this method and system can also utilize any other condenser or condensation subsystem.

The working fluids suitable for use in the systems of this inventions are multi-component fluids that comprises a lower boiling point material—the low boiling component—and a higher boiling point material—the high boiling component. The working fluid, a multi-component mixture of at least two components with different normal boiling temperatures. In the certain embodiments of the system, the mixture consists of water and ammonia, but other working fluids, such as a mixture of hydrocarbons, freons or other substances can be used as well. In other embodiments, the working fluids include, without limitation, an ammonia-water mixture, a mixture of two or more hydrocarbons, a mixture of two or more freons, a mixture of hydrocarbons and freons, or the like. In other embodiments, the working fluid comprises a mixture of water and ammonia. However, the fluid can comprise mixtures of any number of compounds with favorable thermodynamic characteristics and solubilities. Of course, the exact composition of the working fluid changes in different portions of the system where rich and lean streams are formed cooled or heated, compresses or expanded in order to satisfy the overall objective of the system.

The dividing and combining valves used in this invention are well known in the art and are used to split or combine streams. Dividing valve are designed to control the flow rate of the substreams to maintain the system operation.

First Embodiment of the System and Method of This Invention

Figure 1:
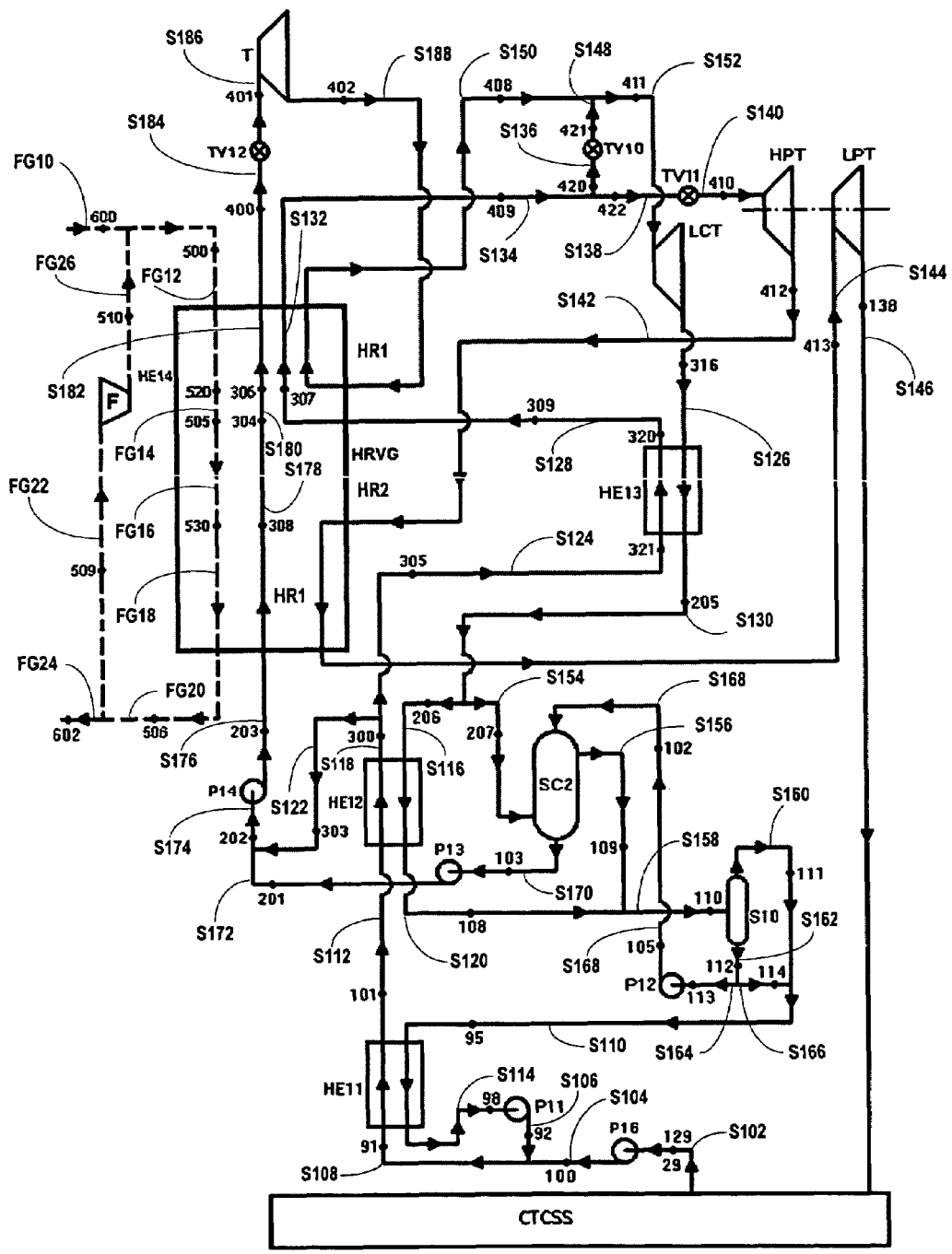
FIG. 1 depicts a first embodiment of a power extraction system and apparatus of this invention.

Referring now to FIG. 1, a schematic block diagram of one embodiment of the system of this inventions, generally 100, is shown. In the system 100, a first fully condensed rich working fluid stream S102 having parameters as at a point 29, where the stream S102 has a high concentration of the low boiling component of the multi-component working fluid, i.e., the stream S102 comprises a rich working fluid stream, exits from a Condensation and Thermal Compression Subsystem CTCSS, where it was fully condensed. The Condensation and Thermal Compression Subsystem CTCSS can be a simple condenser, but is generally a more complex subsystem as described below. The stream S102 having the parameters as at the point 29, redesignated as a point 129, is then pumped by a pump P16, to a desired higher pressure, to form a higher pressure fully condensed rich working fluid stream S104 having parameters as at a point 100. Although the stream S102 having the parameters at as the point 129 is pressurized to the desired higher pressure in the pump P16, the stream S102 having the parameters as at the point 29 or 129 exiting the Condensation and Thermal Compression Subsystem CTCSS can have the desired pressure without the pump P16.

The stream S104 having the parameters as at the point 100 is then mixed with a second higher pressure fully condensed rich working fluid stream S106 having parameters as at a point 92, forming a combined fully condensed rich working fluid stream S108 having parameters as at a point 91. The stream S106 having the parameters as at the point 92 has the same or substantially the same composition and pressure as the stream S104 having the parameters as at the point 100 (as described below). The term substantially as used here means that the composition and pressure and other parameters of the stream S106 having the parameters as at the point 92 are within about 5% of the parameters as at the point 100 of the stream S104.

The combined rich working fluid stream S108 having parameters as at a point 91 passes through a first heat exchanger HE11, where it is heated in counterflow by a mixed rich working fluid stream S110 having parameters as at a point 95 in a first heat exchange process 95-98 and 91-101 (as described below) to form a heated rich working fluid stream S112 having parameters as at a 101 and a second fully condensed rich working fluid stream S114 having parameters as at a point 98. The heated stream S112 having the parameters as at the point 101 corresponds to, or corresponds closely to, a state of saturated liquid, where the term closely means that the parameters are within about 5% of a state of saturated liquid. The heated stream S112 having the parameters as at the point 101 then passes through a boiler-condenser HE12, where it is heated in counterflow by a first mixed intermediate working fluid substream S116 having parameters as at a point 206 in a second heat exchange process 206-108 and 101-300 (as described below) forming a partially vaporized rich working fluid stream S118 having parameters as at point 300 and a cooled mixed intermediate working fluid stream S120 having parameters as at a point 108. The partially vaporized rich working fluid stream S118 having parameters as at the point 300 corresponding to or closely to a state of saturated vapor, where the closely means that the parameters are within about 5% of a state of saturated vapor.

Thereafter, the stream S118 having the parameters as at the point 300 is split into a first partially vaporized rich working fluid substream S122 having parameters as at a point 303 and a second partially vaporized rich working fluid substream S124 having parameters as at a point 305 or 321. The substream S124 having the parameters as at the point 305 then passes through a recuperative heat exchanger HE13, where it is heated in counterflow by a spent intermediate working fluid stream S126 having parameters as at a point 316 in a third heat exchange process 316-205 and 305-320 or 321-320 (as described below) forming a vapor rich working fluid stream S128 having parameters as at a point 320 or 309 (new point designation) and a cooled spent intermediate working fluid stream S130 having parameters as at a point 205.

The stream S128 having the parameters as at the point 309 then enters into an upper section HR3 of a Heat Recovery Vapor Generator HRVG, where it is heated in counterflow by a third flue gas stream FG14 having parameters as at a point 520 in a first HRVG heat exchange process 520-505 or 309-307 (as described below) forming a heated vapor rich working fluid stream S132 having parameters as at a point 307 and a fourth flue gas stream FG16 having parameters as at a point 505. The heated stream S132 having the parameters as at the point 307 is then further heated, in counterflow by a second flue gas stream FG12 having parameters as at a point 500 in a second HRVG heat exchange process 500-520 or 307-409 to form a super-heated vapor rich working fluid stream S134 having parameters as at a point 409 and the third flue gas stream FG14 having the parameters as at the point 520. The stream S134 having the parameters as at the point 409 is then split into a first super-heated vapor rich working fluid substream S136 having parameters as at a point 420 and a second super-heated vapor rich working fluid substream S138 having parameters as at a point 422. A flow rate of stream S138 having the parameters as at the point 422 is equal to a flow rate of stream S102 having the parameters as at the point 129 (as described above). It should be recognized that the flue gas stream are all the same stream, but with different parameters. It should also be recognized that although a single Heat Recovery Vapor Generator HRVG and a single flue gas stream is shown and utilized, the Heat Recovery Vapor Generator HRVG can comprise multiple separate Heat Recovery Vapor Generator HRVG designed to operate with multiple flue gas stream provided that the overall efficiency gains of the present invention are maintained. It should also be noted that the term super-heated means that the temperature of the stream is the temperature set forth in Table 2 below or within about 5% of that temperature.

The rich working fluid stream S138 having the parameters as at the point 422 then passes through an admission valve TV11 forming a pressure adjusted rich working fluid stream S140 having parameters as at a point 410. The stream S140 having the parameters as at the point 410 then enters into a high pressure turbine HPT, where it is expanded to an intermediate pressure forming an intermediate pressure spent rich working fluid stream S142 having parameters as at a point 412 and generating a first amount of electric power or another useable form of energy. The stream S142 having the parameters as at the point 412 is then sent to a lower section HR1 of the Heat Recovery Vapor Generator HRVG, where it is cooled in parallel with a fifth flue gas stream FG18 having parameters as at a point 530 in a fourth HRVG heat exchange process 530-506 or 412-413, forming a cooled intermediate pressure spent rich working fluid stream S144 having parameters as at a point 413 and a spent flue gas stream FG20 having parameters as at a point 506. Heat released in the heat exchange process 412-413 is transferred to the flue gas stream FG18 having the parameters as at the point 530 and to a lean working fluid stream S176 having parameters as at a point 203 as described below. The stream S144 having the parameters as at the point 413 then passes through a low pressure turbine LPT, where it is further expanded, producing a second amount of electric power or other useable energy, forming a spent low pressure rich working fluid stream S146 having parameters as at a point 138. Thereafter, the spent stream S146 having the parameters as at the point 138 is sent into the Condensation and Thermal Compression Subsystem CTCSS, where it is fully condensed from the first fully condensed rich working fluid stream S102 having the parameters as at the point 29/129 (as described above).

Meanwhile, the second super-heated vapor rich working fluid stream S136 having the parameters as at the point 420 (as described above) passes though a control valve TV10, forming a second pressure adjusted rich working fluid stream S148 having parameters as at a point 421. The stream S148 having the parameters as at the point 421 is then mixed with a reheated lean working fluid stream S150 having parameters as at a point 408 (as described below), forming a super-heated intermediate working fluid stream S152 having parameters as at a point 411. The term intermediate working fluid as used herein means that the composition of the intermediate working fluid is intermediate between the lean working fluid and the rich working fluid, i.e., the intermediate working fluid stream has a concentration of the lower boiling component of the multi-component working fluid lower than a concentration of the lower boiling component in the rich working fluid and higher than a concentration of the lower boiling component in the lean working fluid stream.

The stream S152 having the parameters as at the point 411 is then sent into a low concentration turbine LCT, where it expands producing a third amount of electric power or other form of useable energy, to form the spent intermediate working fluid stream S126 having parameters as at the point 316 (as described above). The stream S126 having the parameters as at the point 316 then passes through the third heat exchanger HE13, where it is cooled forming a cooled spent intermediate working fluid stream S130 having the parameters as at the point 205 providing heat for the third heat exchange process 321-320 (as described above). The stream S130 having the parameters as at the point 205 corresponds or close to a state of saturated vapor, where the term close has the same meaning as above.

The stream S130 having the parameters as at the point 205, which is an intermediate working fluid stream, is then divided into the first intermediate working fluid substream S116 having the parameters as at the point 206 and a second intermediate working fluid substream S154 having parameters as at a point 207. The stream S116 having the parameters as at the point 206 then passes through the boiler-condenser HE12, where it is cooled and partially condensed, releasing heat for the second heat exchange process 101-300 (as described above) forming the stream S120 having the parameters as at the point 108. The stream S120 having the parameters as at the point 108 is then combined with an enrich vapor stream S156 having parameters as at a point 109 (as described below) forming a mixed stream S158 having parameters as at a point 110. The mixed stream S158 having the parameters as at the point 110 then enters into a gravity separator S10, where it is separated into a saturated richer vapor stream S160 having parameters as a point 111 and a leaner saturated liquid stream S162 having parameters as at a point 112. Thereafter, the leaner saturated liquid stream S162 having parameters as at the point 112 is divided into a first leaner saturated liquid substream S164 having parameters as at a point 113 and a second leaner saturated liquid substream S166 having parameters as at a point 114.

The leaner liquid substream S166 having the parameters as at the point 114 is combined with the richer vapor stream S160 having the parameters as at the point 111 (as described above), forming the rich working fluid stream S110 having the parameters as at the point 95, which has a composition equal or very close to the composition of the rich working fluid stream S104 having the parameters as at the point 100 (as described above), where the term very close means that the parameters of the streams are within 2% of each other. The stream S110 having the parameters as at the point 95 then passes through the first heat exchanger HE11, where it is fully condensed, releasing heat for the first heat exchange process 91-101 (as described above) forming the stream S114 having the parameters as at the point 98. The stream S114 having the parameters as at the point 98 then enters into a second pump P11, where its pressure is increased to a pressure equal to a pressure of the stream S104 having the parameters as at the point 100 (as described above), forming the second fully condensed higher pressure rich working fluid stream S106 having the parameters as at the point 92. The stream S106 having the parameters as at the point 92 is then combined with the stream S104 having the parameters as at the point 100 forming the rich working fluid stream S108 having the parameters as at the point 91 (as described above).

Meanwhile, the leaner liquid stream S164 having the parameters as at the point 113 enters into a third pump P12, where its pressure is slightly increased to form a stream S168 having parameters as at a point 105. The stream S168 having the parameters as at the point 105 is then sent to a top of a scrubber SC2. As a result of being lifted to the top of the scrubber SC2, the stream S168 obtains parameters as at a point 102, which corresponds or close to a state of saturated liquid, where the term close is a defined above. The stream S168 having the parameters as at the point 102 then enters the top of the scrubber SC2.

Meanwhile, the second intermediate working fluid substream S154 having the parameters as at the point 207, which is in a state of saturated vapor (as described above) enters a lower section of the scrubber SC2. As a result of interaction between the stream S168 having the parameters as at the point 102 and the stream S154 having the parameters as at the point 207 inside of the scrubber SC2, the saturated enriched vapor stream S156 having the parameters as at the point 109 is produced, and exists from an upper portion of the scrubber SC2. At the same time, a very lean saturated liquid stream S170 with parameters as at a point 103 is produced and exits from a bottom of the scrubber SC2 (as described below). Meanwhile, the stream S156 having the parameters as at the point 109 is mixed with the stream S120 having the parameters as at the point 108 (as described above), forming the stream S158 having the parameters as at the point 110 (as described above).

The very lean saturated liquid stream S170 having the parameters as at point 103 has a very low concentration of the low boiling component. The stream S170 having the parameters as at the point 103 then enters into a circulating pump P13, where its pressure is raised to a pressure equal to a pressure of the rich working fluid substream S122 having the parameters as at the point 303, forming a higher pressure very lean liquid stream S172 having parameters as at a point 201. The very lean liquid stream S172 having the parameters as at the point 201 is then combined with the rich working fluid substream S122 having the parameters as at the point 303 (as described above). Because the stream S172 having the parameters as at the point 201 is very lean, and in a state of sub-cooled liquid, it fully absorbs the rich substream S122 having the parameters as at the point 303, which is in a state saturated vapor and forms a lean working fluid stream S174 having parameters as at a point 202, which is in a state of saturated or slightly subcooled liquid.

Thereafter, the lean working fluid stream S174 having the parameters as at the point 202 enters into a fourth pump P14, where its pressure is raised to a high, usually super-critical pressure, to form a super-critical lean working fluid stream S176 having parameters as at a point 203. The stream S176 having the parameters as at the point 203 then passes into a lower section HR1 of the Heat Recovery Vapor Generator HRVG, where it is initially heated in counterflow by the fifth flue gas stream FG18 having the parameters as at the point 530 in the fourth HRVG heat exchange process 530-506, to form a heated lean working fluid stream S178 having parameters as at a point 308 and the spent or sixth flue gas stream FG20 having the parameters as at the point 506. The lean working fluid stream S178 having the parameters as at the point 308 is then further heated, in counterflow with the fourth flue gas stream FG16 having the parameters as at the point 505 in the third HRVG heat exchange process 505-530 in a second or middle section HR2 of the HRVG, to form a hotter lean working fluid stream S180 having parameters as at a point 304 (the temperature of the stream S180 at point 304 is equal to the temperature of the stream S128 at point 309 as described above). The stream S180 having the parameters as at the point 304 is further heated, in counterflow with the third flue gas stream FG14 having the parameters as at the point 520 in the first HRVG heat exchange process 520-505, to from a partially vaporized lean working fluid stream S182 having parameters as at a point 306. Thereafter, the stream S182 having the parameters as at the point 306 is further heated, in counterflow by the second flue gas stream FG12 having the parameters as at the point 500 in the second HRVG heat exchange process 500-520, to form a fully vaporized and super-heated lean working fluid stream S184 having parameters as at a point 400. The stream S184 having the parameters as at the point 400, which is a lean working fluid stream, then passes through an admission valve TV12, to form a pressure adjusted lean working fluid stream S186 having parameters as at a point 401. The stream S186 having the parameters as at the point 401 is then sent into a high pressure turbine T where it is expanded, producing a fourth amount of electric power, and forming a spent lean working fluid stream S188 having parameters as a point 402. A temperature of the stream S132 having the parameter as at the point 307 (as described above) is equal to a temperature of the spent lean working fluid stream S188 having the parameters as at the point 402. Thereafter, the stream S188 having the parameters as at the point 402 is returned into an upper section of the Heat Recovery Vapor Generator HRVG where it is reheated, in counterflow with the flue gas stream FG12 having parameters as at the point 500 in the second HRVG heat exchange process 500-520, forming the reheated lean working fluid stream S150 having the parameters as at the point 408. The stream S150 having the parameters as at the point 408 is mixed with the rich working fluid substream S148 having the parameters as at the point 421, forming the intermediate working fluid stream S152 having the parameters as at the point 411 (as described above).

The sixth flue gas stream FG20 having the parameters as at the point 506 is then divided into a seventh or recycle flue gas stream FG22 having parameters as at a point 509 and a eighth or waste flue gas stream FG24 having parameters as at a point 602. The recycle flue gas stream FG24 having the parameters as at the point 509 is then passed through a re-circulation fan F to form a pressure adjusted recycle flue gas stream FG26 having parameters as at a point 510, which is then mixed with a first flue gas stream FG10 having parameters as at a point 600 to form the second flue gas stream FG12 having the parameters as at the point 500. The mixing of the recycle flue gas stream FG26 and the first flue gas stream FG10 reduces a temperature of the first flue gas stream FG10 to a reduced temperature of the second flue gas stream FG12 to protect the Heat Recovery Vapor Generator HRVG from damage from excessive heat. A flow rate of the recycle flue gas stream FG26 and the initial flue gas stream FG10 is adjusted to achieve a desired reduced temperature of the second flue gas stream FG12.

The working fluid cycle is closed.

Combustion Gas Subsystem

Figure 2:
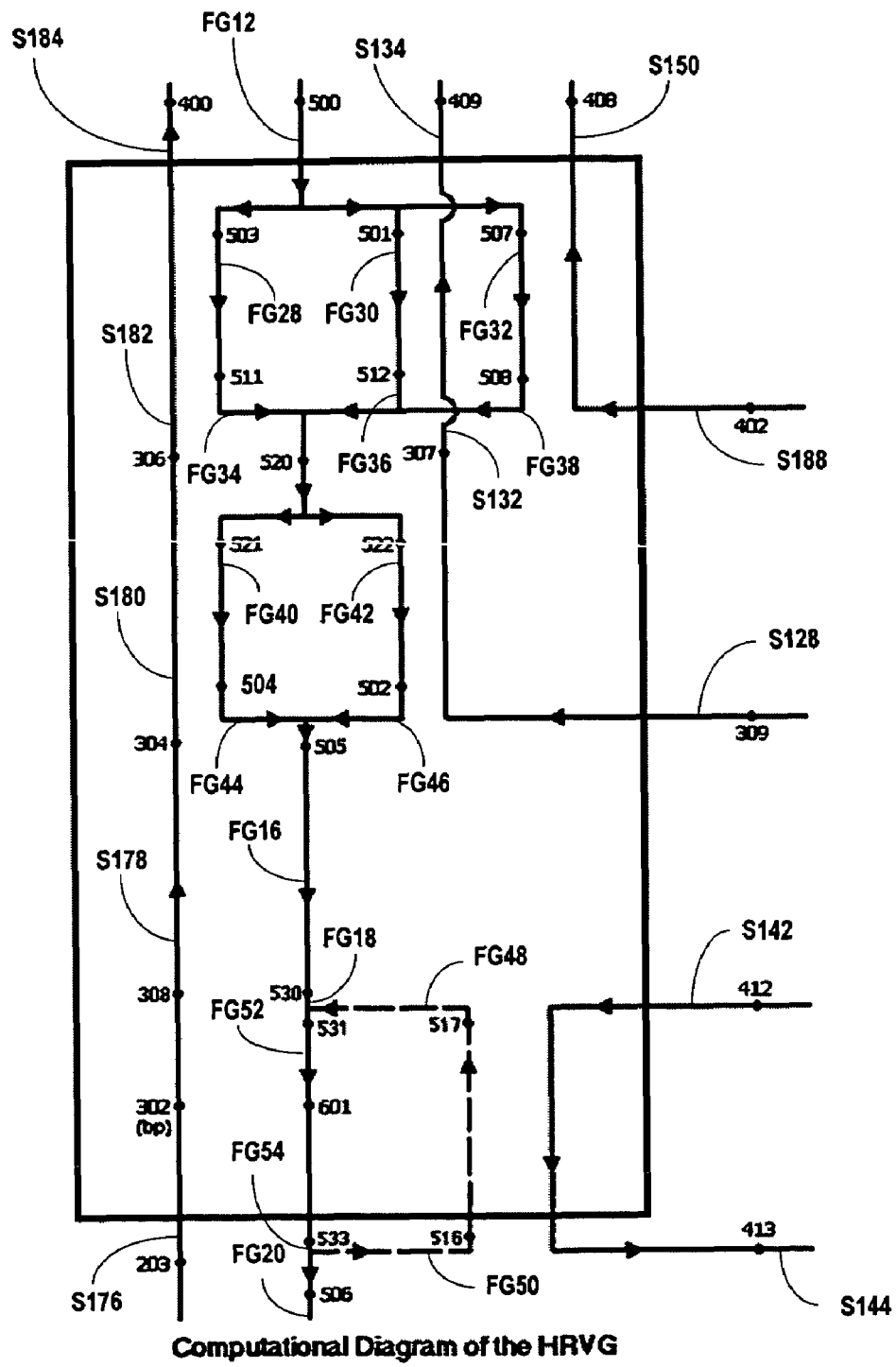
FIG. 2 depicts an expanded view of a computational diagram of the heat recovery vapor generator HRVG subsystem of FIG. 1.

Referring now to FIG. 2, a computational diagram of the Heat Recovery Vapor Generator HRVG is shown. The second or hot flue gas stream FG12 having the parameters as the point 500 is shown computational to be divided into a first substreams FG28 having parameters as at a point 503, a second substreams FG30 having parameters as at a point 501, and a third substreams FG32 having parameters as at a point 507. These three streams FG28, FG30 and FG32 are cooled to a temperature equal to a temperature of the stream FG14 having the parameters as at the point 520 when heating the streams S182, S132, and S188 having parameters as at the points 306, 307 and 402 forming corresponding cooled flue gas stream FG34, FG36 and FG38 having parameters as at points 511, 512, and 508, respectively and the heated stream S134, S184 and S50, respectively. Thus, the stream FG28 provide heat in the heat exchange process 306-400. The stream FG30 provides heat for a heat exchange process 307-409. The stream FG32 provides heat for the heat transfer process 402-408.

Thereafter, the sum total of all three streams FG34, FG36 and FG38 is re-designated as the flue gas stream FG14 having the parameters as at the point 520. The flue gas stream FG14 having the parameters as at the point 520, in turn, is computationally divided into two substreams FG40 and FG42 having parameters as at points 521 and 522, respectively. These streams FG40 and FG42 having parameters as at points 521 and 522, respectively, are cooled to a temperature equal to a temperature of the stream FG16 having the parameters as at the point 505, forming further cooled flue gas stream FG44 and FG46 having parameters as at points 504 and 502, respectively. The substream FG40 provides heat for the heat exchange process 304-306; while the substream FG42 provides heat for the heat exchange process 309-307. Thereafter, the sum total of these two streams FG44 and FG46 is re-designated as the stream FG16 having the parameters as at the point 505.

Thereafter, the stream FG16 having the parameter as at the point 505 is further cooled, providing heat for the heat exchange process 308-304, forming the stream FG18 having the parameters as at the point 530. The stream FG18 having the parameters as at the point 530 is, on the one hand, cooled providing heat for the heat exchange process 203-308, and on the other hand, is heated by the stream S142 having the parameter as at the point 412 in the heat exchange process 412-413 (as described above). This counterflow heating of stream S176 is illustrated in the computation diagram as a flue gas stream FG48 having parameters as at a point 517 in the heat exchange process 516-517 or 412-413 forming the heated stream S178 having parameters as at the point 308 and a cooler flue gas stream FG50 having parameters as at a point 516. The simultaneous counterflow cooling of the flue gas stream FG18 having parameters as at the point 530 by the stream S142 having the parameters as at the point 412 is illustrated in the computational diagram as a flue gas stream FG52 having parameters as at a point 531 involved in a heat exchange process 531-533 or 412-413 to form a flue gas stream FG54 and the cooled stream S144 having parameters as at the point 413. Thus, the heat exchange process that occur in the lower section HR1 of the HRVG involve heat flowing from both the flue gas stream FG18 and the HPT spent stream S142 to the intermediate working fluid stream S176 which is eventually fully vaporized and forwarded to the turbine T as a fully vaporized stream S186 having parameters as at the point 401. The sum total of these two stream FG50 and FG54 make up the spent flue gas stream FG20 having parameters as at the point 506.

Second Embodiment of the System and Method of This Invention

Figure 3:
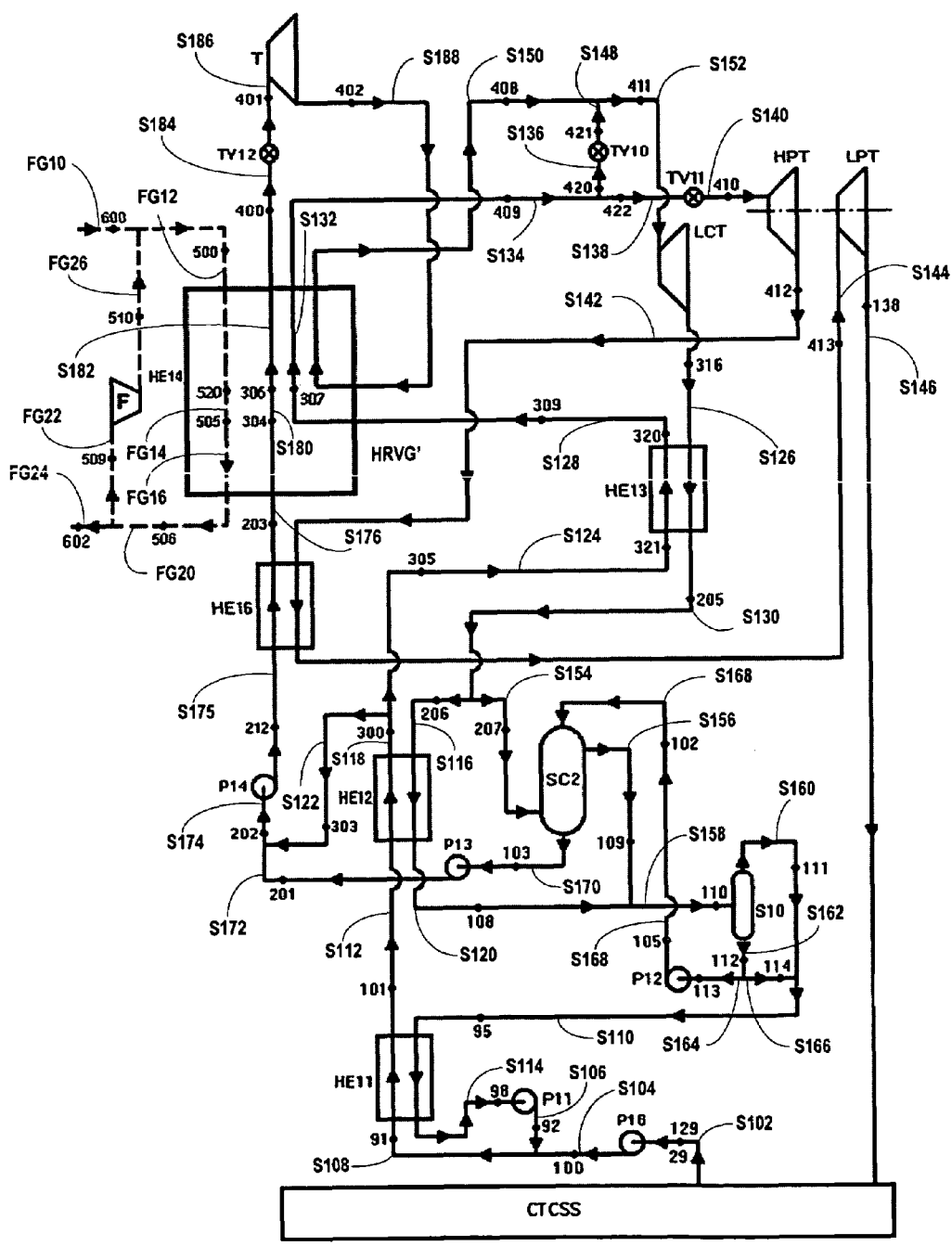
FIG. 3 depicts a second embodiment of a power extraction system and apparatus of this invention.

Referring now to FIG. 3, an alternate embodiment of the system of this invention, generally 300, is shown. Although this is a second embodiment, the point and stream designations used in the first embodiment of FIG. 1 are used, when appropriate, in the description of this system 300. In the system 300, a first fully condensed rich working fluid stream S102 having parameters as at a point 29, where the stream S102 has a high concentration of a low boiling component of the multi-component working fluid, exits a Condensation and Thermal Compression Subsystem CTCSS, where it was fully condensed. The Condensation and Thermal Compression Subsystem CTCSS can be a simple condenser, but is generally a more complex subsystem as described below. The stream S102 having the parameters as at the point 29, redesignated as a point 129, is then pumped by a first pump P16, to a desired higher pressure, to form a first higher pressure rich working fluid stream S104 having parameters as at a point 100. Although the stream S102 having the parameters at as the point 129 is pressurized to the desired higher pressure in the first pump P16, the stream S102 having the parameters as at the point 29 or 129 exiting the Condensation and Thermal Compression Subsystem CTCSS can have the desired higher pressure without the first pump P16 being located in this part of the system, i.e., the first pump P16 can be located in the CTCSS.

The stream S104 having the parameters as at the point 100 is then mixed with a second higher pressure fully condensed rich working fluid stream S106 having parameters as at a point 92, forming a combined rich working fluid stream S108 having parameters as at a point 91. The stream S106 having the parameters as at the point 92 has the same or substantially the same composition and pressure as the stream S104 having the parameters as at the point 100 (as described below). The term substantially as used here means that the composition and pressure and other parameters of the stream S106 having the parameters as at the point 92 are within about 5% of the parameters as at the point 100 of the stream S104.

The combined stream S108 having parameters as at a point 91 passes through a first heat exchanger HE11, where it is heated in counterflow by a mixed rich working fluid stream S110 having parameters as at a point 95 in a first heat exchange process 95-98 and 91-101 (as described below) to form a heated combined rich working fluid stream S112 having parameters as at a 101 and a second fully condensed rich working fluid stream S114 having parameters as at a point 98. The heated stream S112 having the parameters as at the point 101 corresponds to, or corresponds closely to, a state of saturated liquid, where the term closely means that the parameters are within about 5% of a state of saturated liquid. The heated stream S112 having the parameters as at the point 101 then passes through a boiler-condenser HE12, where it is heated and partially vaporized in counterflow by a first intermediate working fluid substream S116 having parameters as at a point 206 in a second heat exchange process 206-108 and 101-300 (as described below) forming a mixed rich working fluid stream S118 having parameters as at point 300 and a mixed intermediate working fluid stream S120 having parameters as at a point 108. The mixed rich working fluid stream S118 having the parameters as at the point 300 corresponding to or closely to a state of saturated vapor, where the closely means that the parameters are within about 5% of a state of saturated vapor.

Thereafter, the mixed rich working fluid stream S118 having the parameters as at the point 300 is split into a first mixed rich working fluid substream S122 having parameters as at a point 303 and a second mixed rich working fluid substream S124 having parameters as at a point 305 or 321. The substream S124 having the parameters as at the point 305 then passes through a recuperative heat exchanger HE13, where it is heated in counterflow by a spent intermediate working fluid stream S126 having parameters as at a point 316 in a third heat exchange process 316-205 and 305-320 or 321-320 (as described below) forming a vapor rich working fluid stream S128 having parameters as at a point 320 or 309 (new point designation) and a cooled spent intermediate working fluid stream S130 having parameters as at a point 205.

The rich working fluid stream S128 having the parameters as at the point 309 then enters into a Heat Recovery Vapor Generator HRVG', where it is heated in counterflow by a third flue gas stream FG14 having parameters as at a point 520 in a first HRVG heat exchange process 520-505 or 309-307 (as described below) forming a heated stream S132 having parameters as at a point 307 and a fourth flue gas stream FG16 having parameters as at a point 505. The heated rich working fluid stream S132 having the parameters as at the point 307 is then further heated, in counterflow by a second flue gas stream FG12 having parameters as at a point 500 in a second HRVG heat exchange process 500-520 or 307-409 to form a superheated vapor rich working fluid stream S134 having parameters as at a point 409 and the third flue gas stream FG14 having the parameters as at the point 520. The rich working fluid stream S134 having the parameters as at the point 409 is then split into a first vapor rich working fluid substream S136 having parameters as at a point 420 and a second vapor rich working fluid substream S138 having parameters as at a point 422. A flow rate of stream S138 having the parameters as at the point 422 is equal to a flow rate of stream S102 having the parameters as at the point 129 (as described above).

The stream S138 having the parameters as at the point 422 then passes through an admission valve TV11 forming a pressure adjusted rich working fluid stream S140 having parameters as at a point 410. The stream S140 having the parameters as at the point 410 then enters into a high pressure turbine HPT, where it is expanded to an intermediate pressure forming a spent intermediate pressure rich working fluid stream S142 having parameters as at a point 412 and generating a first amount of electric power or other useable form of energy. The spent intermediate pressure rich working fluid stream S142 having the parameters as at the point 412 is then passed through an additional heat exchanger HE16, where it is used to heat a higher pressure lean working fluid stream S175 having parameters as at a point 212 in a heat exchange process 412-413 or 212-203 to form a heated higher pressure lean working fluid stream S176 having parameters as at a point 203 and a cooled pent intermediate pressure rich working fluid stream S144 having parameters as at a point 413. The stream S144 having the parameters as at the point 413 then passes through a low pressure turbine LPT, where it is further expanded, producing a second amount of electric power or other useable energy, forming a spent rich working fluid stream S146 having parameters as at a point 138. Thereafter, the spent rich working fluid stream S146 having the parameters as at the point 138 is sent into the Condensation and Thermal Compression Subsystem CTCSS, where it is condensed to form the first fully condensed rich working fluid stream S102 having parameters as at the point 29 or 129.

Meanwhile, the second rich working fluid substream S136 having the parameters as at the point 420 (as described above) passes though a control valve TV10, forming a second pressure adjusted rich working fluid stream S148 having parameters as at a point 421. The stream S148 having the parameters as at the point 421 is then mixed with a reheated lean working fluid stream S150 having parameters as at a point 408 (as described below), forming a super-heated intermediate working fluid stream S152 having parameters as at a point 411. The stream S152 having the parameters as at the point 411 is then sent into a low concentration turbine LCT, where it expands producing a third amount of electric power or other form of useable energy, to form the spent intermediate working fluid stream S126 having parameters as at a point 316. The stream S126 having the parameters as at the point 316 then passes through the third heat exchanger HE13, where it is cooled forming the stream S130 having the parameters as at the point 205 providing heat for the third heat exchange process 321-320 (as described above). The stream S130 having the parameters as at the point 205 corresponds or close to a state of saturated vapor, where the term close has the same meaning as above.

The stream S130 having the parameters as at the point 205, which is an intermediate working fluid stream, is then divided into the first intermediate working fluid substream S116 having the parameters as at the point 206 and a second intermediate working fluid substream S154 having parameters as at a point 207. The first intermediate working fluid substream S116 having the parameters as at the point 206 then passes through the boiler-condenser HE12, where it is cooled and partially condensed, releasing heat for the second heat exchange process 101-300 (as described above) forming the stream S120 having the parameters as at the point 108. The stream S120 having the parameters as at the point 108 is then combined with a stream S156 having parameters as at a point 109 (as described below) forming a stream S158 having parameters as at a point 110. The stream S158 having the parameters as at the point 110 then enters into a gravity separator S10, where it is separated into a saturated vapor stream S160 having parameters as a point 111 and a saturated liquid stream S162 having parameters as at a point 112. Thereafter, the saturated liquid stream S162 having the parameters as at the point 112 is divided into a first saturated liquid substream S164 having parameters as at a point 113 and a second saturated liquid substream S166 having parameters as at a point 114.

The substream S166 having the parameters as at the point 114 is combined with the vapor stream S160 having the parameters as at the point 111 (as described above), forming the stream S110 having the parameters as at the point 95, which has a composition equal or very close to the composition of the rich working fluid stream S104 having the parameters as at the point 100 (as described above), where the term very close means that the parameters of the streams are within 2% of each other. The stream S110 having the parameters as at the point 95 then passes through the first heat exchanger HE11, where it is fully condensed, releasing heat for the first heat exchange process 91-101 (as described above) forming the stream S114 having the parameters as at the point 98. The stream S114 having the parameters as at the point 98 then enters into a second pump P11, where its pressure is increased to a pressure equal to a pressure of the stream S104 having the parameters as at the point 100 (as described above), forming the stream S106 having the parameters as at the point 92. The stream S106 having the parameters as at the point 92 is then combined with the stream S104 having the parameters as at the point 100 forming the stream S108 having the parameters as at the point 91 (as described above).

Meanwhile, the stream S164 having the parameters as at the point 113 enters into a third pump P12, where its pressure is slightly increased to form a stream S168 having parameters as at a point 105. The stream S168 having the parameters as at the point 105 is then sent to a top of a scrubber SC2. As a result of being lifted to the top of the scrubber SC2, the stream S168 obtains parameters as at a point 102, which corresponds or close to a state of saturated liquid, where the term close is as defined above. The stream S168 having the parameters as at the point 102 then enters the top of the scrubber SC2.

Meanwhile, the stream S154 having the parameters as at the point 207, which is in a state of saturated vapor (as described above) enters a lower section of the scrubber SC2. As a result of interaction between the stream S168 having the parameters as at the point 102 and the stream S154 having the parameters as at the point 207 inside of the scrubber SC2, the saturated vapor stream S156 having the parameters as at the point 109 is produced, and exists from an upper portion of the scrubber SC2. At the same time, a saturated liquid stream S170 with parameters as at a point 103 is produced and exits from a bottom of the scrubber SC2 (as described below). Meanwhile, the stream S156 having the parameters as at the point 109 is then mixed with the stream S120 having the parameters as at the point 108 (as described above), forming the stream S158 having the parameters as at the point 110 (as described above).

The saturated liquid stream S170 having the parameters as at point 103 has a very low concentration of the low boiling component, i.e., the stream S170 is very lean. The stream S170 having the parameters as at the point 103 then enters into a circulating pump P13, where its pressure is raised to a pressure equal to a pressure of the stream S122 having the parameters as at the point 303, forming a higher pressure stream S172 having parameters as at a point 201. The stream S172 having the parameters as at the point 201 is then combined with the stream S122 having the parameters as at the point 303 (as described above). Because the stream S172 having the parameters as at the point 201 is lean, and in a state of subcooled liquid, it fully absorbs the stream S122 having the parameters as at the point 303, which is in a state saturated vapor, forming a lean working fluid stream S174 having parameters as at a point 202, which is in a state of saturated or slightly subcooled liquid.

Thereafter, the stream S174 having the parameters as at the point 202 enters into a fourth pump P14, where its pressure is raised to a high, usually super-critical pressure, to form a super-critical stream S175 having parameters as at a point 202. The stream S175 having the parameters as at the point 202 then passes through the additional heat exchanger HE16 in counterflow with the HPT spent stream S142 having the parameters as at the point 412, where it is heated by the stream S142 to form a heated, super-critical stream S176 having parameters as at a point 203, which is then sent into a bottom of the Heat Recovery Vapor Generator HRVG. The heated, super-critical stream S176 having the parameters as at the point 203 is initially heated in counterflow by a fourth flue gas stream FG16 having the parameters as at the point 505 in the second HRVG heat exchange process 505-506, to form a hotter, super-critical lean working fluid stream S180 having parameters as at a point 304 (the temperature of the stream S180 at point 304 is equal to the temperature of the stream S128 at point 309 as described above). The stream S180 having the parameters as at the point 304 is further heated, in counterflow with the third flue gas stream FG14 having the parameters as at the point 520 in the first HRVG heat exchange process 520-505, to from a partially vaporized lean working fluid stream S182 having parameters as at a point 306. Thereafter, the stream S182 having the parameters as at the point 306 is further heated, in counterflow by the second flue gas stream FG12 having the parameters as at the point 500 in the second HRVG heat exchange process 500-520, to form a fully vaporized lean working fluid stream S184 having parameters as at a point 400. The stream S184 having the parameters as at the point 400, which is a lean working fluid stream, then passes through an admission valve TV12, to form a pressure adjusted lean working fluid stream S186 having parameters as at a point 401. The stream S186 having the parameters as at the point 401 is then sent into a high pressure turbine T where it is expanded, producing a fourth amount of electric power, and forming a spent lean working fluid stream S188 having parameters as a point 402. A temperature of the stream S132 having the parameter as at the point 307 (as described above) is equal to a temperature of the spent lean working fluid stream S188 having the parameters as at the point 402. Thereafter, the stream S188 having the parameters as at the point 402 is returned into an upper section of the Heat Recovery Vapor Generator HRVG where it is reheated, in counterflow with the flue gas stream FG12 having parameters as at the point 500 in the second HRVG heat exchange process 500-520, forming the stream S150 having the parameters as at the point 408. The stream S150 having the parameters as at the point 408 is mixed with the stream S148 having the parameters as at the point 421, which is a rich solution stream, forming the intermediate solution stream S152 having the parameters as at the point 411 (as described above).

The fifth flue gas stream FG20 having the parameters as at the point 506 is then divided into a sixth or recycle flue gas stream FG22 having parameters as at a point 509 and a seventh or waste flue gas stream FG24 having parameters as at a point 602. The recycle flue gas stream FG24 having the parameters as at the point 509 is then passed through a re-circulation fan F to form a pressure adjusted recycle flue gas stream FG26 having parameters as at a point 510, which is then mixed with a first flue gas stream FG10 having parameters as at a point 600 to form the second flue gas stream FG12 having the parameters as at the point 500. The mixing of the recycle flue gas stream FG26 and the first flue gas stream FG10 reduces a temperature of the first flue gas stream FG10 to a reduced temperature of the second flue gas stream FG12 to protect the Heat Recovery Vapor Generator HRVG from damage from excessive heat. A flow rate of the recycle flue gas stream FG26 and the initial flue gas stream FG10 is adjusted to achieve a desired reduced temperature of the second flue gas stream FG12.

The working fluid cycle is closed.

CTCSS

CTCSS Variant 1*a*

Referring now to FIG. 4, a preferred embodiment of a CTCSS of this invention, generally 188, is shown and is referred to herein as CTCSS Variant 1*a*. CTCSS Variant 1*a* represents a very comprehensive variant of the CTCSSs of this invention.

The operation of CTCSS Variant 1*a* is now described.

The stream S146 having parameters as at a point 138, which can be in a state of superheated vapor or in a state of saturated or slightly wet vapor, enters into the CTCSS 200. The stream S146 having the parameters as at the point 138 is mixed with a first mixed stream S202 having parameters as at a point 71, which is in a state of a liquid-vapor mixture (as describe more fully herein), forming a first combined stream S204 having parameters as at a point 38. If the stream S146 having the parameters as at the point 138 is in a state of saturated vapor, then a temperature of the stream S202 having the parameters as at the point 71 must be chosen in such a way as to correspond to a state of saturated vapor. As a result, the stream S204 having the parameters as at the point 38 will be in a state of a slightly wet vapor. Alternatively, if the stream S146 having the parameters as at the point 138 is in a state of superheated vapor, then stream S202 having the parameters of at the point 71 must be chosen in such a way that the resulting stream S204 having the parameters as at a point 38 should be in, or close to, a state of saturated vapor, where close to means the state of the vapor is within 5% of the saturated vapor state for the vapor. In all cases, the parameters of the stream S202 at the point 71 are chosen in such a way as to maximize a temperature of the stream S204 at the point 38.

Thereafter, the stream S204 having the parameters as at the point 38 passes through a first heat exchanger HE1, where it is cooled and partially condensed and releases heat in a first heat exchange process, producing a second mixed stream S206 having parameters as at a point 15. The stream S206 having the parameters as at the point 15 is then mixed with a stream S208 having parameters as at a point 8, forming a stream S210 having parameters as at a point 16. In the preferred embodiment of this system, the temperatures of the streams S208, S206 and S210 having parameters of the points 8, 15, and 16, respectively, are equal or very close, within about 5%. A concentration of the low-boiling component in stream S208 having the parameters as at the point 8 is substantially lower than a concentration of the low boiling component in the stream S206 having the parameters as at the point 15. As a result, a concentration of the low boiling component in the stream S210 having the parameters as at the point 16 is lower than the concentration of the low boiling component of the stream S206 having the parameters as at the point 15, i.e., stream S210 having the parameters as at the point 16 is leaner than stream S206 having parameters as at the point 15.

The stream S210 having the parameters as at the point 16 then passes through a second heat exchanger HE2, where it is further condensed and releasing heat in a second heat exchange process, forming a stream S212 having parameters as at a point 17. The stream S212 having the parameters as at the point 17 then passes through a third heat exchanger HE3, where it is further condensed in a third heat exchange process to form a stream S214 having parameters as at a point 18. At the point 18, the stream S214 is partially condensed, but its composition, while substantially leaner that the compositions of the stream S146 and S204 having the parameters as at the points 138 and 38, is such that it cannot be fully condensed at ambient temperature. The stream S214 having the parameters as at the point 18 is then mixed with a stream S216 having parameters as at a point 41, forming a stream S218 having parameters as at a point 19. The composition of the stream S218 having the parameters as at the point 19 is such that it can be fully condensed at ambient temperature.

The stream S218 having the parameters as at the point 19 then passes through a low pressure condenser HE4, where it is cooled in a fourth heat exchange process in counterflow with a stream S220 of cooling water or cooling air having initial parameters as at a point 51 and final parameters as at a point 52, becoming fully condensed, to form a stream S222 having parameters as at a point 1. The composition of the stream S222 having the parameters as at the point 1, referred to herein as the "basic solution," is substantially leaner than the composition of the stream S146 having the parameters at the point 138, which entered the CTCSS 100. Therefore, the stream S222 having the parameters as at the point 1 must be distilled at an elevated pressure in order to produce a stream S146 having the same composition as at point 138, but at an elevated pressure that will allow the stream to fully condense.

The stream S222 having the parameters as at the point 1 is then divided into two substreams S224 and S226 having parameters as at points 2 and 4, respectively. The stream S224 having the parameters as at the point 2 enters into a circulating fourth pump P4, where it is pumped to an elevated pressure forming a stream S228 having parameters as at a point 44, which correspond to a state of subcooled liquid. Thereafter, the stream S228 having the parameters as at the point 44 passes through a third heat exchanger HE3 in counterflow with the stream S212 having the parameters as at the point 17 in a third heat exchange process as described above, is heated forming a stream S230 having parameters as at a point 14. The stream S230 having the parameters as at the point 14 is in, or close to, a state of saturated liquid. Again, the term close to means that the state of the stream S230 is within 5% of being a saturated liquid. Thereafter, the stream S230 having parameters as at point 14 is divided into two substreams S232 and S234 having parameters as at points 13 and 22, respectively. The stream S234 having the parameters as at the point 22 is then divided into two substreams S236 and S238 having parameters as at points 12 and 21, respectively. The stream S236 having the parameters as at the point 12 then passes through the second heat exchanger HE2, where it is heated and partially vaporized in counterflow to the stream S200 having the parameters as at the point 16 as described above in a second heat exchange process, forming a stream S240 having parameters as at a point 11. The stream S240 having the parameters as at the point 11 then passes through the first heat exchanger HE1, where it is further heated and vaporized in counterflow to the stream S204 having stream 38 as described above in a first heat exchange process, forming a stream S242 having parameters as at a point 5.

The stream S242 having the parameters as at the point 5, which is in a state of a vapor-liquid mixture, enters into a first separator S1, where it is separated into a saturated vapor stream S244 having parameters as at a point 6 and saturated liquid stream S246 having parameters as at a point 7.

The liquid stream S246 having the parameters as at the point 7 is divided into two substreams S248 and S250 having parameters as at points 70 and 72, respectively. The stream S248 having the parameters as at the point 70, then passes through an eighth heat exchanger HE8, where it is heated and partially vaporized in an eighth heat exchange process, in counterflow to an external heat carrier stream S252 having initial parameters as a point 638 and final parameters as at a pint 639, forming a stream S254 having parameters as at a point 74. Thereafter, stream S254 having the parameters as at the point 74 passes through a fifth throttle valve TV5, where its pressure is reduced to a pressure equal to a pressure of the stream S146 having the parameters as at the point 138, forming the stream S202 having the parameters as at the point 71. Thereafter, the stream S202 having the parameters as at the point 71 is mixed with the stream S146 having the parameters as at the point 138, forming the stream S204 having the parameters as at the point 38 as previously described.

The stream S250 having parameters as at point 72, then passes through a first throttle valve TV1, where its pressure is reduced, forming a stream S256 having parameters as at a point 73. The pressure of the stream S256 having the parameters as at the point 73 is equal to a pressure of the streams S206, S208, and S210 having the parameters as at the points 15, 8 and 16. Thereafter the stream S256 having the parameters as at the point 73 is mixed with a stream S258 having parameters as at a point 45, forming the stream S208 having the parameters as at the point 8. The stream S208 having the parameters as a the point 8 is then mixed with the stream S206 having the parameters as at the point 15, forming the stream S210 having the parameters as at the point 16 as described above.

Meanwhile, the vapor stream S244 having the parameters as at the point 6 is sent into a bottom part of a first scrubber SC1, which is in essence a direct contact heat and mass exchanger. At the same time, the stream S238 having the parameters as at the point 21 as described above, is sent into a top portion of the first scrubber SC1. As a result of heat and mass transfer in the first scrubber SC1, a liquid stream S260 having parameters as at a point 35, which is in a state close to equilibrium (close means within about 5% of the parameters of the stream S244) with the vapor stream S244 having the parameters as at the point 6, is produced and removed from a bottom of the first scrubber SC1. At the same time, a vapor stream S262 having parameters as at point 30, which is in a state close to equilibrium with the liquid stream S238 having the parameters as at the point 21, exits from a top of the scrubber SC1.

The vapor stream S262 having the parameters as at the point 30 is then sent into a fifth heat exchanger HE5, where it is cooled and partially condensed, in counterflow with a stream S264 of working fluid having parameters as at a point 28 in a fifth heat exchange process, forming a stream S266 having parameters as at a point 25.

The liquid stream S260 having the parameters as at the point 35 is removed from the bottom of the scrubber SC1 and is sent through a fourth throttle valve TV4, where its pressure is reduced to a pressure equal to the pressure of the stream S256 having the parameters as at the point 73, forming the stream S258 having the parameters as at the point 45. The stream S258 having the parameters as at the point 45 is then mixed with the stream S256 having the parameters as at the point 73, forming the stream S208 having the parameters as at the point 8 as described above.

The liquid stream S232 having the parameters as at the point 13, which has been preheated in the third heat exchanger HE3 as described above, passes through a second throttle valve TV2, where its pressure is reduced to an intermediate pressure, (i.e., a pressure which is lower than the pressure of the stream S230 having the parameter as at the point 14, but higher than the pressure of the stream S222 having the parameters as at the point 1), forming a stream S268 parameters as at a point 43, corresponding to a state of a vapor-liquid mixture. Thereafter, the stream S268 having the parameters as at the point 43 is sent into a third separator S3, where it is separated into a vapor stream S270 having parameters as at a point 34 and a liquid stream S272 having parameters as at a point 32.

A concentration of the low boiling component in the vapor stream S270 having the parameters as at the point 34 is substantially higher than a concentration of the low boiling component in the stream S146 having the parameters as at the point 138 as it enters the CTCSS 200 as described above. The liquid stream S272 having the parameters as at the point 32 has a concentration of low boiling component which is less than a concentration of low boiling component in the stream S222 having the parameters, as at the point 1 as described above.

The liquid stream S226 of the basic solution having the parameters as at the point 4 as described above, enters into a first circulating pump P1, where it is pumped to a pressure equal to the pressure of the stream S270 having the parameters as at the point 34, forming a stream S274 having parameters as at a point 31 corresponding to a state of subcooled liquid. Thereafter, the subcooled liquid stream S274 having the parameters as at the point 31 and the saturated vapor stream S270 having the parameters as at the point 34 are combined, forming a stream S276 having parameters as at a point 3. The stream S276 having the parameters as at the point 3 is then sent into an intermediate pressure condenser or a seventh heat exchanger HE7, where it is cooled and fully condensed in a seventh heat exchange process, in counterflow with a stream S278 of cooling water or air having initial parameters as at a point 55 and having final parameters as at a point 56, forming a stream S280 having parameters as at a point 23. The stream S280 having parameters as at point 23 then enters into a second circulating pump P2, where its pressure is increased to a pressure equal to that of the stream S266 having the parameters as at the point 25 as described above, forming a stream S282 parameters as at a point 40. The stream S282 having the parameters as at the point 40 is then mixed with the stream S266 having the parameters as at the point 25 as described above, forming a stream S284 having parameters as at a point 26. The composition and flow rate of the stream S282 having the parameters as at the point 40 are such that the stream S284 having the parameters as at the point 26 has the same composition and flow rate as the stream S146 having the parameters as at the point 138, which entered the CTCSS 200, but has a substantially higher pressure.

Thereafter, the stream S284 having the parameters as at the point 26 enters into a high pressure condenser or sixth heat exchanger HE6, where it is cooled and fully condensed in a sixth heat exchange process, in counterflow with a stream S286 of cooling water or air having initial parameters as at a point 53 and final parameters as at a point 54, forming a steam S288 parameters as at a point 27, corresponding to a state of saturated liquid. The stream S288 having the parameters as at the point 27 then enters into a third or feed pump P3, where it is pumped to a desired high pressure, forming the stream S264 having the parameters as at the point 28. Then the stream S264 of working fluid having the parameters as at the point 28 is sent through the fifth heat exchanger HE5, where it is heated, in counterflow with the stream S262 having the parameters as at the point 30 in the fifth heat exchange process, forming a stream S100 having parameters as at a point 29 as described above. The stream S290 having the parameters as at a point 29 then exits the CTCSS 200, and returns to the power system. This CTCSS of this invention is closed in that no material is added to any stream in the CTCSS.

In some cases, preheating of the working fluid which is reproduced in the CTCSS is not necessary. In such cases, the fifth heat exchanger HE5 is excluded from the CTCSS Variant 1a described above. As a result, the stream S262 having the parameters as at the point 30 and the stream S266 having the parameters as at the point 25 are the same, and the stream S264 having the parameters as at the point 28 are the stream S100 having the parameters as at the point 29 are the same as shown in FIG. 5. The CTCSS system in which HE5 is excluded is referred to as CTCSS Variant 1b.

The CTCSSs of this invention provide highly effective utilization of heat available from the condensing stream S146 of the working solution having the parameters as at the point 138 and of heat from external sources such as from the stream S252.

In distinction from an analogous system described in the prior art, the lean liquid stream S246 having the parameters as at the point 7 coming from the first separator S1, is not cooled in a separate heat exchanger, but rather a portion of the stream S246 is injected into the stream S200 of working fluid returning from the power system.

When the stream S236 of basic solution having the parameters as at the point 12 starts to boil, it initially requires a substantial quantity of heat, while at the same time its rise in temperature is relatively slow. This portion of the reboiling process occurs in the second heat exchanger HE2. In the process of further reboiling, the rate of increase in the temperatures becomes much faster. This further portion of the reboiling process occurs in the first heat exchanger HE1. At the same time, in the process of condensation of the stream S204 having the parameters as at the point 38, initially a relatively large quantity of heat is released, with a relatively slow reduction of temperature. But in further condensation, the rate of reduction of temperature is much higher. As a result of this phenomenon, in the prior art, the temperature differences between the condensing stream of working solution and the reboiling stream of basic solution are minimal at the beginning and end of the process, but are quite large in the middle of the process.

In contrast to the prior art, in the CTCSS of this invention, the concentration of the low boiling component in stream S208 having the parameters as at the point 8 is relatively low and therefore in the second heat exchanger HE2, stream S208 having the parameters as at the point 8 not only condenses itself, but has the ability to absorb additional vapor. As a result, the quantity of heat released in the second heat exchanger HE2 in the second heat exchange process is substantially larger than it would be if streams S208 and S206 having the parameters as at the points 8 and 15, respectively, were cooled separately and not collectively collect after combining the two stream S208 and S206 to form the stream S210. As a result, the quantity of heat available for the reboiling process comprising the first and second heat exchange processes is substantially increased, which in turn increases the efficiency of the CTCSS system.

The leaner the stream S208 having the parameters at as the point 8 is, the greater its ability to absorb vapor, and the greater the efficiency of the heat exchange processes occurring in the first and second heat exchangers HE1 and HE2. But the composition of the stream S208 having the parameters at as the point 8 is defined by the temperature of the stream S242 having the parameters as at the point 5; the higher the temperature of the stream S242 having the parameters as at the point 5, the leaner the composition of stream S208 having the parameters at as the point 8 can be.

It is for this reason that external heat derived from stream S252 is used to heat stream S248 having the parameters as at the point 70, thus raising the temperature of the stream S204 having the parameters as at the point 38, and as a result also raising the temperature of the stream S242 having the parameters as at the point 5. However, increasing of the temperature of the stream S242 having the parameters as at the point 5, and correspondingly the temperature of the stream S244 having the parameters as at a point 6, leads to a reduction in a concentration of the low boiling component in the vapor stream S244 having the parameters as at the point 6.

Use of the scrubber SC1, in place of a heat exchanger, for the utilization of heat from the stream S244 having the parameters as at the point 6 allows both the utilization of the heat from the stream S244 having the parameters as at the point 6 and an increase of the concentration of low boiling component in the produced vapor stream S262 having the parameters as at the point 30.

The vapor stream S262 having the parameters as at the point 30 has a concentration of low-boiling component which is higher than the concentration of the low boiling component in the vapor stream S244 having the parameters as at the point 6, and the flow rate of stream S262 having the parameters as at the point 30 is higher than the flow rate of the stream S244 having the parameters as at the point 6.

The concentration of low boiling component in the working fluid is restored in the stream S284 having the parameters at the point 26, by mixing the stream S266, a very rich solution, having the parameters as at the point 25 (or the stream S262 having the parameters as at the point 30, in the case of the CTCSS Variant 1b), with the stream S282 having the parameters as at the point 40. The stream S282 having the parameters as at point 40 has a higher concentration of low boiling component than the basic solution, (i.e., is enriched). Such an enrichment has been used in the prior art, but in the prior art, in order to obtain this enrichment, a special intermediate pressure reboiling process is needed requiring several additional heat exchangers.

In the CTCSSs of this invention, all heat that is available at a temperature below the boiling point of the basic solution (i.e., below the temperature of the stream S230 having the parameters as at the point 14) is utilized in a single heat exchanger, the third heat exchanger HE3. Thereafter, the vapor needed to produce the enriched stream S282 having the parameters as at the point 40 is obtained simply by throttling the stream S232 having the parameters as at the point 13.

The CTCSSs of this invention can be simplified by eliminating some "modular" components. For instance, it is possible to enrich the stream S282 having the parameters as at the point 40 without using the intermediate pressure condenser, the seventh heat exchanger HE7. Such a system, with preheating of the stream S264 of working fluid having the parameters as at the point 28 is shown in FIG. 6, and referred to as CTCSS Variant 2a. A similar system, but without preheating the stream S264 of working fluid having the parameters as at the point 28, is shown in FIG. 7, and referred to as CTCSS Variant 2b.

In the CTCSS Variant 2a and CTCSS Variant 2b, in distinction to the CTCSS Variant 1a and CTCSS Variant 1b, the pressure of the stream S268 having the parameters as at the point 43 is chosen in such a way that the when mixing the vapor stream S270 having the parameters as at the point 34 and the liquid stream S274 having the parameters as at the point 31, the subcooled liquid stream S274 having the parameters as at the point 31 fully absorbs the vapor stream S270 having the parameters as at the point 34, and the resulting stream S276 having the parameters as at the point 3 is in a state of saturated, or slightly subcooled, liquid. Thereafter, the liquid S276 having the parameters as at the point 3 is sent into the second pump P2, to form the stream S282 having the parameters as at the point 40, and is mixed with stream 25.

The simplification of the CTCSS of CTCSS Variant 2a and CTCSS Variant 2b reduces the overall efficiency of the CTCSSs of this invention, but at the same time, the cost is also reduced.

Another possible modular simplification of the CTCSS Variant 1a and CTCSS Variant 1b can be used in a case where external heat is not available, or the choice is made not to utilize external heat. Such a variant of the CTCSS of this invention, with preheating of the stream S264 of working fluid having the parameters as at the point 28 is shown in FIG. 8, and is referred to as CTCSS Variant 3a. A similar CTCSS of this invention, but without preheating the stream S264 of the working fluid having the parameters as at the point 28, is shown in FIG. 9, and referred to as CTCSS Variant 3b.

In CTCSS Variant 3a and CTCSS Variant 3b, the stream S248 having the parameters as at the point 70 is not heated, but rather simply passes through the fifth throttle valve TV5, to form the stream S202 having the parameters as at the point 71, and is then mixed with the stream S146 having the parameters as at the point 138, forming the stream S204 having the parameters as at the point 38. This mixing process is used only in a case where the stream S146 having the parameters as at the point 138 is in a state of superheated vapor. The flow rate of streams S248 and S202 having the parameters as at the points 70 and 71 is chosen in such a way that the stream S204 having the parameters as at the point 38 formed as a result of mixing the stream S202 having the parameters as at the point 71 and the stream S146 having the parameters as at the point 138 is in a state of saturated, or slightly wet, vapor.

It is also possible to simplify CTCSS Variant 2a and CTCSS Variant 2b in the same manner than CTCSS Variant 1a and CTCSS Variant 1b are simplified to obtain CTCSS Variant 3a and CTCSS Variant 3b. This modular simplification of CTCSS Variant 2a and CTCSS Variant 2b, with preheating of the stream S264 of the working fluid having the parameters as at the point 28 is shown in FIG. 10, and is referred to as CTCSS Variant 4a; while a similar simplification of CTCSS Variant 2b, without preheating the stream S264 of the working fluid having the parameters as at the point 28, is shown in FIG. 11, and referred to as CTCSS Variant 4b.

A final modular simplification is attained by eliminating the scrubber SC1, and the use of the stream S282 having the parameters as at the point 40 without any enrichment, i.e., the composition of stream S282 having the parameters as at the point 40 is the same as the composition of the basic solution. This modular simplification of CTCSS Variant 4a, with preheating of the stream S264 of the working fluid having the parameters as at the point 28 is shown in FIG. 12, and is referred to as CTCSS Variant 5a. A similar simplification of CTCSS Variant 4b, without preheating the stream S264 of the working fluid having the parameters as at the point 28, is shown in FIG. 13, and referred to as CTCSS Variant 5b. It must be noted that the modular simplification of the CTCSS Variant 5a and CTCSS Variant 5b results in a substantial reduction of the efficiency of the CTCSS. Also in Variants 5a and 5b, the stream S222 having the parameters as at the point 1 is not split into two substreams S222 and S224 which are then separately pressurized, but is pressurized in as a single stream in a pump P5 forming a stream S292 having parameters as at a point 46. The stream S292 is then split to form the stream S228 having the parameters as at the point 44 and the stream S282 having the parameters as at the point 40.

The CTCSSs of this invention is described in the five basic variants given above; (two of which utilize external heat, and three of which utilize only the heat available from the stream S200 of the working fluid entering the CTCSSs of this invention). One experienced in the art would be able to generate additional combinations and variants of the proposed systems. For instance, it is possible to simplify CTCSS Variant 4a by eliminating the scrubber SC1, while retaining the enrichment of the stream S282 having the parameters as at the points 40. (Likewise it is possible to retain the scrubber SC1, and eliminate only the enrichment process for the stream S282 having the parameters as at the points 40.) However all such modular simplifications are still based on the initial CTCSS Variant 1a of the CTCSSs of this invention.

The efficacy of the CTCSS of this invention, per se, can be assessed by its compression ratio; i.e., a ratio of the pressure of the stream S284 having the parameters as at the point 26 (at the entrance to the high pressure condenser, heat exchanger HE6) to the pressure of the stream S146 having the parameters as at the point 138 (at the point of entrance of the stream of working solution into the CTCSS). The impact of the efficacy of the CTCSS on the efficiency of the whole system depends on the structure and parameters of work of the whole system. For assessing the CTCSSs of this invention, several calculations have been performed. A stream comprising a water-ammonia mixture having a composition of 0.83 weight fraction of ammonia (i.e., 83 wt. % ammonia), with an initial temperature of 1050° F. and an initial pressure of 1800 psia, has been expanded in a turbine with an isoentropic efficiency of 0.875 (87.5%). The parameters of the vapor upon exiting the turbine correspond to the stream S146 having the parameters at the point 138. Such computations have been performed for all proposed "b" variants of the CTCSS of this invention described above, and for a simple condenser system as well.

A summary of performance for the primary version of the system 100 of FIG. 1 using the Variant 1a of the CTCSS is given in Table 1. The parameters of key points of the system 100 are given in Table 2. The data in these tables are based on the use of very low quality fuel, (i.e., brown coal with a wetness of 50% by weight).

As is shown in the data, in spite of the fuel quality, the primary version of the system achieves a very high efficiency. The thermal efficiency is 47.13%. In combination with an RCSS module, the LHV efficiency is 45.25%.

By comparison, the most advanced supercritical Rankine cycle available in the prior art has an LHV efficiency of 42%.

It must also be noted that with superior fuels, one can expect substantially higher efficiencies from the proposed systems. With low wetness fuel (approximately 10% wetness by weight,) the system of this invention can attain an LHV efficiency of over 46%

TABLE 1

Performance Summary

| | | |
|---|---|---|
| Heat in | 530,395.92 kW | 1,519.55 Btu/lb |
| Heat rejected | 271,643.78 kW | 778.24 Btu/lb |
| Turbine enthalpy Drops | 275,314.97 kW | 788.76 Btu/lb |
| Gross Generator Power | 270,574.05 kW | 775.18 Btu/lb |
| Process Pumps (−47.59) | −17,652.90 kW | −50.57 Btu/lb |
| Cycle Output | 252,921.14 kW | 724.60 Btu/lb |
| Other Pumps and Fans (−7.87) | −2,921.11 kW | −8.37 Btu/lb |
| Net Output | 250,000.03 kW | 716.23 Btu/lb |
| Gross Generator Power | 270,574.05 kW | 775.18 Btu/lb |
| Cycle Output | 252,921.14 kW | 724.60 Btu/lb |
| Net Output | 250,000.03 kW | 716.23 Btu/lb |
| Net thermal efficiency | 47.13% % | |
| Second Law Limit | 66.75% % | |
| Second Law Efficiency | 70.61% % | |
| LHV Heat Avail (at 59° F.) | 552,515.85 kW | 1,582.92 Btu/lb |
| LHV Efficiency | 45.25% % | |

Overall Heat Balance Btu/lb

| | |
|---|---|
| Heat In: | Source + pumps = 1,519.55 + 47.59 = 1,567.14 |
| Heat Out: | Turbines + condenser = 788.76 + 778.24 = 1,567.00 |

TABLE 2

System Point Summary

| Pt. | X lb/lb | T °F. | P psia | H Btu/lb | S Btu/lb-R | Ex Btu/lb | Grel G/G = 1 | Gabs lb/h | Ph. | Wetness/T lb/lb/°F. |
|---|---|---|---|---|---|---|---|---|---|---|
| Working Fluid | | | | | | | | | | |
| 1 | 0.5041 | 65.79 | 38.157 | −72.4690 | 0.0136 | 0.1850 | 5.94491 | 7,085,135 | Mix | 1 |
| 2 | 0.5041 | 65.79 | 38.157 | −72.4690 | 0.0136 | 0.1850 | 5.55636 | 6,622,067 | Mix | 1 |
| 3 | 0.6377 | 91.16 | 67.835 | 106.6356 | 0.3310 | 15.2492 | 0.53371 | 636,074 | Mix | 0.7586 |
| 4 | 0.5041 | 65.79 | 38.157 | −72.4690 | 0.0136 | 0.1850 | 0.38855 | 463,068 | Mix | 1 |
| 5 | 0.5041 | 188.51 | 99.048 | 264.8792 | 0.5765 | 45.5344 | 1.37636 | 1,640,346 | Mix | 0.6774 |
| 6 | 0.9367 | 188.51 | 99.048 | 659.6564 | 1.2501 | 92.9145 | 0.44403 | 529,195 | Mix | 0 |
| 7 | 0.2980 | 188.51 | 99.048 | 76.8630 | 0.2558 | 22.9692 | 0.93233 | 1,111,151 | Mix | 1 |
| 8 | 0.3047 | 147.65 | 42.157 | 73.0965 | 0.2542 | 20.0435 | 1.12349 | 1,338,971 | Mix | 0.9417 |
| 11 | 0.5041 | 142.65 | 101.048 | 95.0956 | 0.3041 | 17.0537 | 1.37636 | 1,640,346 | Mix | 0.8634 |
| 12 | 0.5041 | 120.97 | 103.048 | −10.7403 | 0.1248 | 4.2091 | 1.37636 | 1,640,346 | Mix | 1 |
| 13 | 0.5041 | 120.97 | 103.048 | −10.7403 | 0.1248 | 4.2091 | 3.94888 | 4,706,276 | Mix | 1 |
| 14 | 0.5041 | 120.97 | 103.048 | −10.7403 | 0.1248 | 4.2091 | 5.55636 | 6,622,067 | Mix | 1 |
| 15 | 0.7942 | 147.65 | 42.157 | 509.9721 | 1.0721 | 34.9004 | 1.01770 | 1,212,895 | Mix | 0.2181 |
| 16 | 0.5374 | 147.65 | 42.157 | 280.7424 | 0.6430 | 27.1050 | 2.14119 | 2,551,866 | Mix | 0.5978 |
| 17 | 0.5374 | 127.13 | 41.157 | 212.7108 | 0.5300 | 17.6443 | 2.14119 | 2,551,866 | Mix | 0.6626 |
| 18 | 0.5374 | 83.99 | 40.157 | 53.5136 | 0.2485 | 4.4864 | 2.14119 | 2,551,866 | Mix | 0.8334 |
| 19 | 0.5041 | 80.46 | 40.157 | −2.1560 | 0.1453 | 2.1511 | 5.94491 | 7,085,135 | Mix | 0.9149 |
| 21 | 0.5041 | 118.00 | 97.048 | −10.7403 | 0.1249 | 4.1794 | 0.23112 | 275,446 | Mix | 0.9943 |
| 22 | 0.5041 | 120.97 | 103.048 | −10.7403 | 0.1248 | 4.2091 | 1.60748 | 1,915,792 | Mix | 1 |
| 23 | 0.6377 | 65.79 | 65.835 | −60.6817 | 0.0196 | 9.4569 | 0.53371 | 636,074 | Mix | 1 |
| 24 | 0.9367 | 188.51 | 99.048 | 659.6564 | 1.2501 | 92.9145 | 0.44403 | 529,195 | Mix | 0 |
| 25 | 0.9922 | 127.00 | 97.048 | 597.4895 | 1.1574 | 79.0471 | 0.46629 | 555,724 | Mix | 0 |

TABLE 2-continued

System Point Summary

| Pt. | X lb/lb | T °F. | P psia | H Btu/lb | S Btu/lb-R | Ex Btu/lb | Grel G/G = 1 | Gabs lb/h | Ph. | Wetness/T lb/lb/°F. |
|---|---|---|---|---|---|---|---|---|---|---|
| 26 | 0.8030 | 88.38 | 97.048 | 246.3385 | 0.5519 | 41.1160 | 1.00000 | 1,191,799 | Mix | 0.535 |
| 27 | 0.8030 | 65.79 | 95.048 | −24.6000 | 0.0446 | 33.2775 | 1.00000 | 1,191,799 | Mix | 1 |
| 28 | 0.8030 | 67.89 | 877.323 | −20.6185 | 0.0459 | 36.5923 | 1.00000 | 1,191,799 | Liq | −168.29° F. |
| 29 | 0.8030 | 67.89 | 877.323 | −20.6185 | 0.0459 | 36.5923 | 1.00000 | 1,191,799 | Liq | −168.29° F. |
| 30 | 0.9922 | 127.00 | 97.048 | 597.4895 | 1.1574 | 79.0471 | 0.46629 | 555,724 | Mix | 0 |
| 31 | 0.5041 | 65.92 | 67.835 | −72.2578 | 0.0138 | 0.2927 | 0.38855 | 463,068 | Liq | −30.18° F. |
| 32 | 0.4853 | 101.14 | 67.835 | −33.4935 | 0.0858 | 1.5891 | 3.80372 | 4,533,269 | Mix | 1 |
| 34 | 0.9955 | 101.14 | 67.835 | 585.4596 | 1.1762 | 57.2921 | 0.14516 | 173,007 | Mix | 0 |
| 35 | 0.3341 | 174.51 | 99.048 | 56.6024 | 0.2290 | 16.7621 | 0.20886 | 248,917 | Mix | 1 |
| 38 | 0.7942 | 193.51 | 43.157 | 739.5911 | 1.4323 | 77.6873 | 1.01770 | 1,212,895 | Vap | 0° F. |
| 40 | 0.6377 | 65.93 | 97.048 | −60.4546 | 0.0198 | 9.5777 | 0.53377 | 636,074 | Liq | −21.58° F. |
| 41 | 0.4853 | 78.71 | 40.157 | −33.4935 | 0.0872 | 0.8794 | 3.80372 | 4,533,269 | Mix | 0.9611 |
| 43 | 0.5041 | 101.14 | 67.835 | −10.7403 | 0.1259 | 3.6368 | 3.94888 | 4,706,276 | Mix | 0.9632 |
| 44 | 0.5041 | 65.98 | 108.048 | −72.0882 | 0.0138 | 0.4372 | 5.55636 | 6,622,067 | Liq | −57.99° F. |
| 45 | 0.3341 | 136.57 | 42.157 | 56.6024 | 0.2323 | 15.0369 | 0.20886 | 248,917 | Mix | 0.9409 |
| 70 | 0.2980 | 188.51 | 99.048 | 76.8630 | 0.2558 | 22.9692 | 0.01770 | 21,097 | Mix | 1 |
| 71 | 0.2980 | 151.15 | 43.157 | 76.8630 | 0.2589 | 21.3633 | 0.01770 | 21,097 | Mix | 0.9434 |
| 72 | 0.2980 | 188.51 | 99.048 | 76.8630 | 0.2558 | 22.9692 | 0.91463 | 1,090,054 | Mix | 1 |
| 73 | 0.2980 | 150.18 | 42.157 | 76.8630 | 0.2590 | 21.2813 | 0.91463 | 1,090,054 | Mix | 0.942 |
| 91 | 0.8030 | 135.84 | 1,915.000 | 59.2474 | 0.1803 | 46.7871 | 1.78904 | 2,132,176 | Liq | −198.86° F. |
| 92 | 0.8030 | 214.30 | 1,915.000 | 153.8295 | 0.3293 | 64.0434 | 0.78904 | 940,377 | Liq | −120.4° F. |
| 95 | 0.8030 | 354.28 | 665.206 | 765.7739 | 1.1784 | 235.5835 | 0.78904 | 940,377 | Mix | 0.0062 |
| 98 | 0.8030 | 207.88 | 663.206 | 146.3108 | 0.3275 | 57.4875 | 0.78904 | 940,377 | Mix | 1 |
| 100 | 0.8030 | 70.60 | 1,915.000 | −15.3817 | 0.0476 | 40.9774 | 1.00000 | 1,191,799 | Liq | −264.1° F. |
| 101 | 0.8030 | 333.88 | 1,905.000 | 332.4560 | 0.5719 | 116.8818 | 1.78904 | 2,132,176 | Mix | 1 |
| 102 | 0.3111 | 354.27 | 667.206 | 269.9730 | 0.5191 | 79.5755 | 0.85102 | 1,014,242 | Liq | −0.36° F. |
| 103 | 0.1316 | 432.95 | 668.206 | 387.1429 | 0.6268 | 140.0832 | 0.86759 | 1,033,992 | Mix | 1 |
| 105 | 0.3111 | 354.40 | 682.206 | 270.1391 | 0.5192 | 79.6745 | 0.85102 | 1,014,242 | Liq | −2.84° F. |
| 108 | 0.4514 | 351.88 | 665.206 | 401.6744 | 0.6952 | 120.5557 | 1.17492 | 1,400,266 | Mix | 0.7286 |
| 109 | 0.7912 | 359.33 | 667.206 | 778.3574 | 1.1923 | 240.9183 | 0.46514 | 554,354 | Mix | 0 |
| 110 | 0.5478 | 354.28 | 665.206 | 508.5062 | 0.8363 | 154.6294 | 1.64006 | 1,954,619 | Mix | 0.5219 |
| 111 | 0.8060 | 354.28 | 665.206 | 768.8484 | 1.1825 | 236.5510 | 0.78418 | 934,585 | Mix | 0 |
| 112 | 0.3111 | 354.28 | 665.206 | 269.9733 | 0.5191 | 79.5705 | 0.85588 | 1,020,035 | Mix | 1 |
| 113 | 0.3111 | 354.28 | 665.206 | 269.9730 | 0.5191 | 79.5703 | 0.85102 | 1,014,242 | Mix | 1 |
| 114 | 0.3111 | 354.28 | 665.206 | 269.9730 | 0.5191 | 79.5703 | 0.00486 | 5,792 | Mix | 1 |
| 129 | 0.8030 | 67.89 | 877.323 | −20.6185 | 0.0459 | 36.5923 | 1.00000 | 1,191,799 | Liq | −168.29° F. |
| 138 | 0.8030 | 223.16 | 43.157 | 751.3225 | 1.4524 | 79.0596 | 1.00000 | 1,191,799 | Vap | 31.4° F. |
| 201 | 0.1316 | 437.54 | 1,900.000 | 392.8736 | 0.6278 | 145.2655 | 0.86759 | 1,033,992 | Liq | −133.11° F. |
| 202 | 0.3115 | 499.16 | 1,900.000 | 477.0212 | 0.7461 | 168.8958 | 1.18512 | 1,412,425 | Liq | −0.01° F. |
| 203 | 0.3115 | 522.88 | 4,960.000 | 495.4848 | 0.7493 | 185.6625 | 1.18512 | 1,412,425 | Liq | −291.54° F. |
| 205 | 0.4514 | 434.95 | 668.206 | 971.8950 | 1.3572 | 347.3998 | 1.65663 | 1,974,369 | Mix | 0 |
| 206 | 0.4514 | 434.95 | 668.206 | 971.8950 | 1.3572 | 347.3998 | 1.17492 | 1,400,266 | Mix | 0 |
| 207 | 0.4514 | 434.95 | 668.206 | 971.8950 | 1.3572 | 347.3998 | 0.48171 | 574,103 | Mix | 0 |
| 300 | 0.8030 | 425.95 | 1,900.000 | 706.9376 | 1.0202 | 258.8395 | 1.78904 | 2,132,176 | Mix | 0 |
| 303 | 0.8030 | 425.95 | 1,900.000 | 706.9376 | 1.0202 | 258.8395 | 0.31753 | 378,433 | Mix | 0 |
| 304 | 0.3115 | 741.95 | 4,945.000 | 970.3022 | 1.1829 | 435.6085 | 1.18512 | 1,412,425 | Vap | 335.1° F. |
| 305 | 0.8030 | 425.95 | 1,900.000 | 706.9376 | 1.0202 | 258.8395 | 1.47151 | 1,753,743 | Mix | 0 |
| 306 | 0.3115 | 799.57 | 4,941.565 | 1,064.3512 | 1.2595 | 489.9378 | 1.18512 | 1,412,425 | Vap | 392.7° F. |
| 307 | 0.8030 | 799.57 | 1,882.420 | 1,047.3507 | 1.3478 | 429.3095 | 1.47151 | 1,753,743 | Vap | 374° F. |
| 308 | 0.3115 | 689.20 | 4,948.617 | 855.8006 | 1.0853 | 371.7183 | 1.18512 | 1,412,425 | Vap | 282.4° F. |
| 309 | 0.8030 | 741.95 | 1,885.000 | 1,003.2222 | 1.3118 | 403.8621 | 1.47151 | 1,753,743 | Vap | 316.4° F. |
| 316 | 0.4514 | 822.70 | 673.206 | 1,235.0713 | 1.6027 | 483.2697 | 1.65663 | 974,369 | Vap | 387.1° F. |
| 320 | 0.8030 | 741.95 | 1,885.000 | 1,003.2222 | 1.3118 | 403.8621 | 1.47151 | 1,753,743 | Vap | 316.4° F. |
| 321 | 0.8030 | 425.95 | 1,900.000 | 706.9376 | 1.0202 | 258.8395 | 1.47151 | 1,753,743 | Mix | 0 |
| 400 | 0.3115 | 1,077.44 | 4,925.000 | 1,348.4669 | 1.4654 | 667.2434 | 1.18512 | 1,412,425 | Vap | 670.6° F. |
| 401 | 0.3115 | 1,076.00 | 4,875.000 | 1,348.4669 | 1.4664 | 666.7327 | 1.18512 | 1,412,425 | Vap | 669.2° F. |
| 402 | 0.3115 | 799.57 | 1,830.000 | 1,228.3755 | 1.4749 | 542.2095 | 1.18512 | 1,412,425 | Vap | 235.9° F. |
| 408 | 0.3115 | 1,076.00 | 1,820.000 | 1,422.2497 | 1.6149 | 663.4834 | 1.18512 | 1,412,425 | Vap | 512.9° F. |
| 409 | 0.8030 | 1,076.95 | 1,870.000 | 1,260.3152 | 1.5013 | 562.6547 | 1.47151 | 1,753,743 | Vap | 651.7° F. |
| 410 | 0.8030 | 1,076.00 | 1,820.000 | 1,260.3152 | 1.5044 | 561.0765 | 1.00000 | 1,191,799 | Vap | 652.1° F. |
| 411 | 0.4514 | 1,077.02 | 1,820.000 | 1,376.1600 | 1.5953 | 628.1848 | 1.65663 | 1,974,369 | Vap | 545.1° F. |
| 412 | 0.8030 | 739.20 | 400.000 | 1,044.2181 | 1.5165 | 338.6899 | 1.00000 | 1,191,799 | Vap | 419.5° F. |
| 413 | 0.8030 | 591.73 | 393.000 | 947.9302 | 1.4328 | 285.8039 | 1.00000 | 1,191,799 | Vap | 273.2° F. |
| 420 | 0.8030 | 1,076.95 | 1,870.000 | 1,260.3152 | 1.5013 | 562.6547 | 0.47151 | 561,944 | Vap | 651.7° F. |
| 421 | 0.8030 | 1,076.00 | 1,820.000 | 1,260.3152 | 1.5044 | 561.0765 | 0.47151 | 561,944 | Vap | 652.1° F. |
| 422 | 0.8030 | 1,076.95 | 1,870.000 | 1,260.3152 | 1.5013 | 562.6547 | 1.00000 | 1,191,799 | Vap | 651.7° F. |
| Heat Source | | | | | | | | | | |
| 500 | GAS | 1,220.00 | 14.933 | 497.1689 | 0.6515 | 176.8137 | 7.77223 | 9,262,927 | Vap | 1074.5° F. |
| 501 | GAS | 1,220.00 | 14.933 | 497.1689 | 0.6515 | 176.8137 | 2.76825 | 3,299,191 | Vap | 1074.5° F. |
| 502 | GAS | 773.73 | 14.881 | 361.2683 | 0.5578 | 89.4826 | 2.86115 | 3,409,918 | Vap | 628.3° F. |
| 503 | GAS | 1,220.00 | 14.933 | 497.1689 | 0.6515 | 176.8137 | 2.97435 | 3,544,826 | Vap | 1074.5° F. |
| 504 | GAS | 773.73 | 14.881 | 361.2683 | 0.5578 | 89.4826 | 4.91107 | 5,853,009 | Vap | 628.3° F. |
| 505 | GAS | 773.73 | 14.881 | 361.2683 | 0.5578 | 89.4826 | 7.77223 | 9,262,927 | Vap | 628.3° F. |

TABLE 2-continued

System Point Summary

| Pt. | X lb/lb | T °F. | P psia | H Btu/lb | S Btu/lb-R | Ex Btu/lb | Grel G/G = 1 | Gabs lb/h | Ph. | Wetness/T lb/lb/°F. |
|---|---|---|---|---|---|---|---|---|---|---|
| 506 | GAS | 566.73 | 14.783 | 301.2562 | 0.5051 | 56.8388 | 7.77223 | 9,262,927 | Vap | 421.6° F. |
| 507 | GAS | 1,220.00 | 14.933 | 497.1689 | 0.6515 | 176.8137 | 2.02963 | 2,418,910 | Vap | 1074.5° F. |
| 508 | GAS | 850.32 | 14.898 | 383.9639 | 0.5756 | 102.9596 | 2.02963 | 2,418,910 | Vap | 704.9° F. |
| 509 | GAS | 566.73 | 14.783 | 301.2562 | 0.5051 | 56.8388 | 3.60807 | 4,300,096 | Vap | 421.6° F. |
| 510 | GAS | 569.77 | 14.933 | 302.1231 | 0.5052 | 57.6399 | 3.60807 | 4,300,096 | Vap | 424.2° F. |
| 511 | GAS | 850.32 | 14.898 | 383.9639 | 0.5756 | 102.9596 | 2.97435 | 3,544,826 | Vap | 704.9° F. |
| 512 | GAS | 850.32 | 14.898 | 383.9639 | 0.5756 | 102.9596 | 2.76825 | 3,299,191 | Vap | 704.9° F. |
| 516 | GAS | 566.73 | 14.783 | 301.2562 | 0.5051 | 56.8388 | 2.26279 | 2,696,786 | Vap | 421.6° F. |
| 517 | GAS | 714.20 | 14.858 | 343.8090 | 0.5434 | 79.4906 | 2.26279 | 2,696,786 | Vap | 568.9° F. |
| 520 | GAS | 850.32 | 14.898 | 383.9639 | 0.5756 | 102.9596 | 7.77223 | 9,262,927 | Vap | 704.9° F. |
| 521 | GAS | 850.32 | 14.898 | 383.9639 | 0.5756 | 102.9596 | 4.91107 | 5,853,009 | Vap | 704.9° F. |
| 522 | GAS | 850.32 | 14.898 | 383.9639 | 0.5756 | 102.9596 | 2.86115 | 3,409,918 | Vap | 704.9° F. |
| 530 | GAS | 714.20 | 14.858 | 343.8090 | 0.5434 | 79.4906 | 7.77223 | 9,262,927 | Vap | 568.9° F. |
| 531 | GAS | 714.20 | 14.858 | 343.8090 | 0.5434 | 79.4906 | 10.0350 | 11,959,713 | Vap | 568.9° F. |
| 533 | GAS | 566.73 | 14.783 | 301.2562 | 0.5051 | 56.8388 | 10.0350 | 11,959,713 | Vap | 421.6° F. |
| 550 | GAS | 566.73 | 14.783 | 301.2562 | 0.5051 | 56.8388 | 4.16415 | 4,962,831 | Vap | 421.6° F. |
| 551 | GAS | 566.73 | 14.783 | 301.2562 | 0.5051 | 56.8388 | 1.21374 | 1,446,530 | Vap | 421.6° F. |
| 552 | GAS | 566.73 | 14.783 | 301.2562 | 0.5051 | 56.8388 | 2.95042 | 3,516,301 | Vap | 421.6° F. |
| 555 | GAS | 211.36 | 14.765 | 202.4733 | 0.3872 | 19.1795 | 2.95042 | 3,516,301 | Vap | 66.3° F. |
| 557 | GAS | 145.00 | 14.693 | 184.4675 | 0.3593 | 15.6477 | 2.95042 | 3,516,301 | Vap | 0.1° F. |
| 560 | AIR | 59.00 | 14.693 | 13.3154 | 0.0655 | −0.5500 | 2.44609 | 2,915,245 | Vap | 13.8° F. |
| 561 | AIR | 62.67 | 15.005 | 14.2015 | 0.0658 | 0.2041 | 2.44609 | 2,915,245 | Vap | 17° F. |
| 562 | AIR | 548.73 | 14.987 | 133.3511 | 0.2268 | 35.8362 | 2.44609 | 2,915,245 | Vap | 503.1° F. |
| 570 | GAS | 570.86 | 14.987 | 302.4348 | 0.5052 | 57.9282 | 1.21374 | 1,446,530 | Vap | 425.2° F. |
| 571 | GAS | 556.72 | 14.987 | 189.4257 | 0.3191 | 43.1553 | 3.65983 | 4,361,775 | Mix | 411.03 |
| 585 | Water | 59.00 | 14.693 | 27.1360 | 0.0536 | 0.0429 | 0.26589 | 316,888 | Liq | −152.95° F. |
| 586 | Ash | 59.00 | 14.693 | 6.7500 | 0.0000 | 22.4809 | 0.02659 | 31,689 | Liq | 518.67° F. |
| 587 | DAF | 59.00 | 14.693 | 6.7500 | 0.0000 | 22.4809 | 0.23930 | 285,199 | Liq | 518.67° F. |
| 590 | Ash | 1,742.00 | 14.693 | 427.5000 | 0.3614 | 799.4526 | 0.02659 | 31,689 | Liq | 2201.67° F. |
| 598 | GAS | 2,183.54 | 14.933 | 815.8004 | 0.8009 | 417.9519 | 2.95042 | 3,516,301 | Vap | 2038° F. |
| 599 | GAS | 1,838.11 | 14.933 | 698.2770 | 0.7532 | 325.1346 | 2.95042 | 3,516,301 | Vap | 1692.6° F. |
| 600 | GAS | 1,742.00 | 14.933 | 666.1683 | 0.7390 | 300.4294 | 4.16415 | 4,962,831 | Vap | 1596.5° F. |
| 602 | GAS | 566.73 | 14.783 | 301.2562 | 0.5051 | 56.8388 | 4.16415 | 4,962,831 | Vap | 421.6° F. |
| Coolant | | | | | | | | | | |
| 50 | Water | 51.70 | 14.693 | 19.8239 | 0.0394 | 0.0948 | 21.2657 | 25,344,472 | Liq | −160.25° F. |
| 51 | Water | 51.79 | 24.693 | 19.9424 | 0.0396 | 0.1233 | 21.2657 | 25,344,472 | Liq | −187.57° F. |
| 52 | Water | 71.46 | 14.693 | 39.5987 | 0.0774 | 0.1902 | 21.2657 | 25,344,472 | Liq | −140.5° F. |
| 53 | Water | 51.70 | 14.693 | 19.8239 | 0.0394 | 0.0948 | 11.7924 | 14,054,124 | Liq | −160.25° F. |
| 54 | Water | 51.79 | 24.693 | 19.9424 | 0.0396 | 0.1233 | 11.7924 | 14,054,124 | Liq | −187.57° F. |
| 55 | Water | 74.78 | 14.693 | 42.9182 | 0.0836 | 0.2781 | 11.7924 | 14,054,124 | Liq | −137.17° F. |
| 56 | Water | 51.70 | 14.693 | 19.8239 | 0.0394 | 0.0948 | 3.01167 | 3,589,308 | Liq | −160.25° F. |
| 57 | Water | 51.79 | 24.693 | 19.9424 | 0.0396 | 0.1233 | 3.01167 | 3,589,308 | Liq | −187.57° F. |
| 58 | Water | 81.46 | 14.693 | 49.5933 | 0.0960 | 0.5154 | 3.01167 | 3,589,308 | Liq | −130.49° F. |

The data in Tables 1 and 2 clearly evidence that the systems and apparatuses of this invention have improved heat extraction efficiencies and better utilize the energy in the flue gas streams from combustors without cause thermal stress and damage to heat recovery vapor generator, where heat from the flue gas is used to vaporize several working fluid stream having different composition.

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

I claim:

1. A method for extracting energy from a multi-component working fluid comprising the steps of:
    extracting a portion of thermal energy in a fully vaporized, higher pressure lean working fluid stream S186 having parameters as at a point 401 in a first high pressure turbine T to produce a first amount of usable energy forming a spent lean working fluid stream S188 having parameters as at a point 402,
    reheating the spent lean working fluid stream S188 having the parameters as at the point 402 in a heat recovery vapor generator HRVG utilizing heat from a mixed flue gas stream to form a reheated spent lean working fluid stream S150 having parameter as at a point 408,
    mixing the reheated spent lean working fluid stream S150 having the parameter as at the point 408 with a pressure adjusted first portion of a fully vaporized, higher pressure rich working fluid stream S148 having parameter as at a point 421 to form a fully vaporized, intermediate composition working fluid stream S152 having parameter as at a point 411,
    extracting a portion of thermal energy in from the fully vaporized, intermediate composition working fluid stream S152 having the parameter as at the point 411 in a low concentration turbine LCT to produce a second amount of usable energy forming a spent intermediate working fluid stream S126 having parameter as at a point 316, extracting thermal energy from a second portion of the fully vaporized, higher pressure rich working fluid stream S140 having the parameter as at the point 410 in a second high pressure turbine HPT to produce a third amount of usable energy forming a spent intermediate pressure rich working fluid stream S142 having parameter as at a point 412, passing the spent intermediate pressure rich working fluid stream S142 having the parameter as at the point 412 in counter-flow with a higher pressure lean working fluid stream S175 having parameters as at a point 212 in a first heat exchange unit forming a heated, higher pressure lean working fluid stream S176 having parameter as at a point 203 and a cooled intermediate pressure, rich working fluid stream S144 having parameters as at a point 413, extracting thermal energy from the cooled intermediate pressure, rich working fluid stream S144 having the parameters as at the point 413 in a low pressure turbine LPT to produce a fourth amount of usable energy forming a spent rich working fluid stream S146 having parameter as at a point 138, fully condensing the spent rich working fluid stream S146 having the parameter as at the point 138 in a condensation and thermal compression subsystem CTCSS to form a first fully condensed, rich working fluid stream S102 having parameter as at a point 129, pressurizing the first fully condensed, rich working fluid stream S102 having the parameters as at the point 129 and a second fully condensed, rich working fluid stream S114 having parameters as at a point 98 to form a first fully condensed, higher pressure rich working fluid stream S104 having parameters as at a point 100 and a second fully condensed, higher pressure rich working fluid stream S106 having parameters as at a point 92, mixing the first and second fully condensed, higher pressure rich working fluid streams S104 and S106 to form a combined fully condensed, higher pressure rich working fluid stream S108 having parameters as at a point 91, passing the combined fully condensed, higher pressure rich working fluid stream S108 having the parameters as at the point 91 in counter-flow with a second rich working fluid stream S110 having parameters as at a point 95 in a first heat exchanger HE11 forming the second fully condensed rich working fluid stream S114 having parameters as at a point 98 and a heated, higher pressure rich working fluid stream S112 having parameters as at a point 101, passing the heated, higher pressure rich working fluid stream S112 having the parameters as at the point 101 in counter-flow with a first portion of a cooled, spent intermediate composition working fluid stream S116 having parameters as at a point 206 in a second heat exchanger HE12 forming the cooled first portion of the cooled, spent intermediate composition working fluid stream S120 having parameters as at a point 108 and a partially vaporized, higher pressure rich working fluid stream S118 having parameters as at a point 300, passing a first portion of the partially vaporized, higher pressure rich working fluid stream S124 having the parameters as at the point 305 in counter-flow with the spent intermediate composition working fluid stream S126 having the parameters as at the point 316 in a third heat exchanger HE13 forming a cooled, spent intermediate composition working fluid stream S130 having parameters as at a point 205 and a vaporized, higher pressure rich working fluid stream S128 having parameters as at a point 309, feeding a second portion of the cooled intermediate composition working fluid stream S154 having parameters as at a point 207 into a lower section of a scrubber SC2 and a first portion of a lean liquid stream S168 having parameters as at a point 102 into a top of the scrubber SC2, withdrawing a very lean liquid stream S170 having parameters as at a point 103 from a bottom of the scrubber SC2 and a first enriched vapor stream S156 having parameters as at a point 109, mixing the first enriched vapor stream S156 having the parameters as at the point 109 with the cooled first portion of the cooled, spent intermediate composition working fluid stream S120 having parameters as at a point 108 to form a second mixed stream S158 having parameters as at a point 110, separating the second mixed stream S158 having the parameters as at the point 110 in a gravity separator S10 to form a second enriched vapor stream S160 having parameters as at a point 111 and the lean liquid stream S162 having parameters as at a point 112, mixing a second portion of the lean liquid stream S166 having parameters as at a point 114 with the second enriched vapor stream S160 having parameters as at a point 111 to form the second rich working fluid stream S110 having parameters as at a point 95, mixing a pressure adjusted, very lean stream S172 having parameters as at a point 201 with a second portion of the partially vaporized, higher pressure rich working fluid stream S122 having the parameters as at the point 303 to form a fully condensed, lean working fluid stream S174 having parameters as at a point 202, pressuring the fully condensed, lean working fluid stream S174 having parameters as at a point 202 to form the fully condensed, higher pressure lean working fluid stream S175 having parameters as at a point 212, fully vaporizing the heated, higher pressure lean working fluid stream S176 having parameters as at a point 203 in counter-flow with the mixed flue gas stream to form the fully vaporized, higher pressure lean working fluid stream S186 having the parameters as at the point 401, and fully vaporizing the first portion of the vaporized, higher pressure rich working fluid stream S128 having the parameters as at the point 309 in counter-flow with the mixed flue gas stream to form the fully vaporized, higher pressure rich working fluid stream S134 having parameters as at a point 409.

2. A method for extracting energy from a multi-component working fluid comprising the steps of:

forming a fully condensed, high pressure rich working fluid stream from a spent rich working fluid stream, where the rich working fluid stream has a high concentration of a low boiling component of the multi-component working fluid, forming a fully condensed, high pressure lean working fluid stream from a first portion of a partially vaporized, high pressure rich working fluid stream and a very lean liquid stream having a very low concentration of the low boiling component of the multi-component fluid, where the lean working fluid stream has a low concentration of the low boiling component of the multi-component working fluid, vaporizing a second portion of the partially vaporized, high pressure rich working fluid stream with heat derived from a mixed flue gas stream and a spent intermediate working fluid stream to form a fully vaporized high pressure rich working fluid stream vaporizing the fully condensed lean working fluid stream heat derived from the mixed flue gas stream and a spent, intermediate pressure rich working fluid stream to form a fully vaporized high pressure lean working fluid stream and a cooled, spent, intermediate pressure rich working fluid stream, extracting a first amount of electric power or other useable energy from a portion of thermal energy in the fully vaporized high pressure lean working fluid stream in a first high pressure turbine to form a spent lean working fluid stream, forming a fully vaporized intermediate working fluid stream form a first portion of the fully vaporized high pressure rich working fluid stream and a reheated spent lean working fluid stream, where the intermediate working fluid stream has a concentration of the low boiling component of the multi-component fluid between the high concentration of the rich working fluid and the low concentration of the lean working fluid, extracting a second amount of electric power or other useable energy from a portion of thermal energy in the fully vaporized intermediate working fluid stream in a low concentration turbine to form the spent intermediate working fluid stream, extracting a third amount of electric power or other useable energy from a portion of thermal energy in a second portion of the high pressure rich working fluid stream in a second high pressure turbine to form the spent, intermediate pressure rich working fluid stream, and extracting a fourth amount of electric power or other useable energy from a portion of thermal energy in the cooled, spent, intermediate pressure rich working fluid stream in a low pressure turbine to form the spent rich working fluid stream.

3. An apparatus for extracting energy in a thermodynamic cycle comprising:
a vaporizing subsystem adapted to (a) fully vaporize a higher pressure, lean working fluid stream comprising a first portion of a partially vaporized, higher pressure rich working fluid stream and a very lean liquid stream, (b) fully vaporize a first portion of a higher pressure, rich working fluid stream, and (c) reheat a spent lean working fluid stream from heat derived from a mixed flue gas stream forming a fully vaporized, higher pressure lean working fluid stream, a fully vaporized, higher pressure rich working fluid stream, and a reheated, spent lean working fluid stream,
an energy conversion subsystem including:
a first high pressure turbine adapted to convert a portion of thermal energy in the fully vaporized, higher pressure lean working fluid stream into a first amount of useable energy forming the spent lean working fluid stream,
a low concentration turbine adapted to convert a portion of thermal energy in a fully vaporized, intermediate working fluid stream into a second amount of useable energy, where the fully vaporized intermediate working fluid stream comprises a first portion of a pressure adjusted, fully vaporized, rich working fluid stream and the reheated, spent lean working fluid stream forming a spent intermediate working fluid stream, and a rich working fluid stream extraction unit including:
a second high pressure turbine or stage adapted to convert a portion of thermal energy in with a second portion of the fully vaporized, higher pressure rich working fluid stream into a third amount of useable energy forming a spent, intermediate pressure rich working fluid stream and a low pressure turbine or stage adapted to convert a portion of heat associated with a cooled, spent, intermediate pressure rich working fluid stream into a fourth amount of useable energy to form a spent rich working fluid stream,
a separation subsystem including:
a scrubber adapted to scrub and separate a first portion of a cooled, spent intermediate working fluid stream and a first portion of a lean liquid stream into a first enriched vapor stream and the very lean liquid stream, and a separator adapted to separate a mixed stream comprising a cooled second portion of the cooled, spent intermediate working fluid stream and the first enriched vapor stream into a second enriched vapor stream and the lean liquid stream,
a condensation subsystem adapted to fully condense the spent rich working fluid stream into a first fully condensed rich working fluid stream, and
a heat exchange subsystem including:
a first heat exchange unit adapted to fully condense a second rich working fluid stream comprising the second enriched vapor stream and a second portion of the lean liquid stream and to heat a combined, higher pressure rich working fluid stream comprising a first fully condensed, higher pressure rich working fluid stream and a second fully condensed, higher pressure rich working fluid stream,
a second heat exchange unit adapted to partially vaporize the combined rich working fluid stream and to cool the second portion of the spent intermediate working fluid stream forming a partially vaporized, higher pressure rich working fluid stream and the cooled second portion of the cooled, spent intermediate working fluid stream, and a third heat exchange unit adapted to vaporize a second portion of the partially vaporize the combined rich working fluid stream and to cool the spent intermediate working fluid stream forming the vaporized, higher pressure rich working fluid stream and the cooled spent intermediate working fluid.

4. The apparatus of claim 3, further comprising;
a pressurizing subsystem including:
a first pump adapted to increase a pressure of the first fully condensed rich working fluid stream to form the first fully condensed, higher pressure rich working fluid stream,
a second pump adapted to increase a pressure of the second fully condensed rich working fluid stream to form the second fully condensed, higher pressure rich working fluid stream,
a third pump adapted to increase a pressure of the fully condensed lean working fluid stream to form the fully condensed, high pressure lean working fluid stream.

5. The apparatus of claim 3, wherein the vaporization subsystem comprises a heat recovery vapor generator HRVG, which utilizes thermal energy in a mixed flue gas stream comprising an hot initial flue gas stream and a portion of a spend flue gas stream, where the mixed flue gas stream has a temperature that reduces damage to the heat recovery vapor generator HRVG.

6. The apparatus of claim 3, wherein the first heat exchange unit is a first heat exchanger HE11, the second heat exchange unit is a boiler-condenser HE12, and the third heat exchange unit is a recuperative heat exchanger HE13.

7. The apparatus of claim 3, wherein the vaporizing subsystem is a heat recovery vapor generator having third heat exchange zone, the first zone is adapted to vaporize the lean working fluid stream with heat derived from a flue gas stream and a spent high pressure rich working fluid stream, the second zone is adapted to heat the vaporized lean working fluid stream with heat derived from the flue gas stream, and the first zone is adapted to super-heat the lean vaporized lean working fluid stream, to super heat the rich working fluid stream and to reheat a spent lean working fluid stream.

8. The apparatus of claim 3, wherein the flue gas stream comprises a mixture of a hot flue gas stream and a portion of a spent flue gas stream.

* * * * *